US012696015B1

(12) United States Patent
Zhang et al.

(10) Patent No.: US 12,696,015 B1
(45) Date of Patent: Jul. 28, 2026

(54) SYSTEMS AND METHODS FOR DATA CENTER INTERCONNECTS

(71) Applicant: CABLE TELEVISION LABORATORIES, INC., Louisville, CO (US)

(72) Inventors: Haipeng Zhang, Broomfield, CO (US); Zhensheng Jia, Superior, CO (US); Mu Xu, Broomfield, CO (US); Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 878 days.

(21) Appl. No.: 17/940,532

(22) Filed: Sep. 8, 2022

Related U.S. Application Data

(60) Provisional application No. 63/219,702, filed on Jul. 8, 2021.

(51) Int. Cl.
 H04Q 11/00 (2006.01)
 H04B 10/40 (2013.01)

(52) U.S. Cl.
 CPC ......... H04Q 11/0067 (2013.01); H04B 10/40 (2013.01); H04Q 11/0005 (2013.01); H04Q 2011/0016 (2013.01); H04Q 2011/0081 (2013.01); H04Q 2011/009 (2013.01)

(58) Field of Classification Search
 None
 See application file for complete search history.

(56) References Cited

U.S. PATENT DOCUMENTS

| | | | |
|---|---|---|---|
| 10,944,478 | B2 | 3/2021 | Zhang et al. |
| 11,108,490 | B2 | 8/2021 | Jia et al. |
| 11,750,357 | B1 | 9/2023 | Zhang et al. |
| 2010/0034532 | A1* | 2/2010 | Ghelfi ................. H04J 14/0219 |
| | | | 398/19 |
| 2019/0268074 | A1* | 8/2019 | Jia ........................... H04J 14/06 |
| 2020/0119813 | A1* | 4/2020 | Zhang .................. H04B 10/505 |

OTHER PUBLICATIONS

Cheng et al., "Recent advances in optical technologies for data centers: a review," Optica, Oct. 24, 2018, 5(11): 1354-1370.
Urata et al. "Datacenter Interconnect and Networking: from Evolution to Holistic Revolution," Optical Fiber Communication Conference, OFC 2017, Mar. 19-23, 2017, paper W3G.1, pp. 1-3.

(Continued)

*Primary Examiner* — David W Lambert
(74) *Attorney, Agent, or Firm* — Lathrop GPM

(57) ABSTRACT

A data center interconnect (DCI) includes a downstream (DS) transceiver array including one or more DS transceivers. The DCI further includes a first comb source in operable communication with the US transceiver array. The first comb source is configured to generate one or more first spaced optical signals. The DCI further includes an upstream (US) transceiver array including one or more US transceivers in operable communication, over an optical communication medium, with the one or more DS transceivers, respectively, of the DS transceiver array. The DCI further includes a second comb source in operable communication with the US transceiver array. The second comb source is configured to generate one or more second spaced optical signals.

20 Claims, 21 Drawing Sheets

(56) References Cited

OTHER PUBLICATIONS

Zhang et al., "Full-duplex Coherent Optical System Enabled by Comb-Based Injection Locking Optical Process", Optical Fiber Communication Conference (2020), Mar. 8-12, 2020, paper T4G.4, pp. 1-3.

Zhou et al., "Beyond 1Tb/s Datacenter Interconnect Technology: Challenges and Solutions," 2019 Optical Fiber Communications Conference and Exhibition (OFC), Mar. 3-7, 2019, pp. 1-3.

Zhou et al., "Beyond 1 Tb/s Intra-Data Center Interconnect Technology: IM-DD OR Coherent?," Journal of Lightwave Technology, Jan. 15, 2020, 38(2): 475-484.

Zhou et al. "Datacenter optics: requirements, technologies, and trends (Invited Paper)," Chin. Opt. Lett., May 10, 2017, 15(5): 120008.

* cited by examiner

122

$100(1)_{US}$ $100(2)_{US}$ $100(3)_{US}$ $100(4)_{US}$

US TRx
126

$US_1$    $DS_1$    $US_2$    $DS_2$    $US_3$    $DS_3$    $US_4$    $DS_4$

M U X

132

130

M U X

128

$DS_1$    $US_1$    $DS_2$    $US_2$    $DS_3$    $US_3$    $DS_4$    $US_4$ $100(1)_{DS}$ $100(2)_{DS}$ $100(3)_{DS}$ $100(4)_{DS}$

DS TRx
124

SYSTEMS AND METHODS FOR DATA CENTER INTERCONNECTS

CROSS REFERENCE TO RELATED APPLICATIONS

This application claims the benefit of and priority to U.S. Provisional Patent Application Ser. No. 63/219,702, filed Jul. 8, 2021, the subject matter of which is incorporated herein by reference in its entirety.

BACKGROUND

The field of the disclosure relates generally to communication networks, and more particularly, to innovative optical links for data center communication.

Recent continuous growth in data-intensive applications and services, such as high-definition video-on-demand, residential data services, cloud computing/storage, Internet of Things (IoT), "Big Data," business services, cellular connectivity, etc., has resulted in a related continuous increase in the overall traffic volume demanded and delivered across today's communication networks. To support this increasing demand, network operators are increasingly utilizing fiber and optical access technologies. For example, conventional short-distance implementations are known to deploy optical access networks utilizing intensity modulation direct detection (IM-DD) technology to mitigate the overall cost and complexity of the network in point-to-point (P2P) and passive optical network (PON) links. However, although IM-DD technology has evolved significantly over the last two decades, IM-DD-based network solutions suffer from significant limitations with respect to modulation bandwidth, transmission distances, PON split ratio, and poor receiver sensitivity.

For example, over the last decade, data centers have become a key technology cause for the explosive growth of data-intensive applications and services (e.g., social networking, HD video streaming, IoT, online interactive maps and navigation, cloud computing and storage). Communication within data centers occurs over data center interconnects (DCIs), which originally relied primarily on copper-based solutions; however, DCIs have more recently become reliant on fiber-based optical interconnects as a primary technology to support the ongoing increasing demand for more and faster data delivery, and particularly for DCI solutions of a distance beyond a few meters.

First generation optical DCI solutions were based on single-wavelength IM-DD technologies using two-level pulse-amplitude modulation (PAM2) and small form-factor pluggable (SFP+) modules. Second generation optical DCI solutions employed 40 Gb/s modules based on a 4-lane coarse wavelength division multiplexing (CWDM) configuration in a quad small form-factor pluggable (QSFP) module. Third generation optical DCI solutions kept the number of lanes to 4, but increased data speeds to 100 Gb/s by increasing the speed of each lane to 25 Gb/s. Fourth generation optical DCI solutions have achieved speeds of 400 Gb/s by adopting the more bandwidth-efficient PAM4 modulation, while doubling the number of optical lanes from 4 to 8 in an octal small form-factor pluggable (OSFP) package. The most recent (i.e., fifth) generation of optical DCI solutions have reached 800 Gb/s bandwidth in an OSFP module by doubling the baud rate of the fourth generation DCI optics from 25 Gbaud to 50 Gbaud. As described further below with respect to FIGS. 1A-B, at present, IM-DD-based optical interconnects remain the prevalent DCI solution due to the ease of implementation and relatively low power consumption.

FIG. 1A is a schematic illustration depicting a conventional IM-DD transceiver 100. Transceiver 100 includes a transmitting portion 102 and a receiving portion 104. Transmitting portion 102 includes a laser source 106 (a distributed feedback (DFB) laser, in this example) and a modulator 108 (a Mach Zehnder modulator (MZM) or an electro-absorption modulator (EAM), in this example). Modulator 108 modulates, onto a laser from laser source 106, a data signal from a transmitter digital signal processor (DSP) 110, after the data signal is first converted by a digital-to-analog convert (DAC) 112 and delivered through a driver 114, for delivery to an opposing receiver/transceiver (downstream or upstream, relative to transceiver 100) over an IM-DD communication network. Receiving portion 104 receives at a photodetector/transimpedance amplifier (PD/TIA) 116, an optical transmission from the opposing transceiver or a transmitter thereof, converts the received signal using an analog-to-digital converter (ADC) 118, and then processes the converted signal by a receiver DSP 120. In this example, the respective signals are shown to be PAM-based IM-DD signals.

FIG. 1B is a schematic illustration depicting a conventional DCI system architecture 122 for an 800 Gb/s interface based on conventional transceiver 100, FIG. 1A. Architecture 122 illustrates a 4-lane topology for a PAM-based IM-DD having a downstream (DS) transceiver array 124 including four separate transceivers 100. Each DS transceiver 100 of DS transceiver array 124 is in operable communication, respectively, with an equal number (i.e., four) of corresponding upstream (US) transceivers 100 of a US transceiver array 126. Thus, each transceiver of DS transceiver array 124 and US transceiver array 126 conforms with the structure and functionality of conventional transceiver 100; that is, a respective transmitting portion 102, FIG. 1A, of a particular DS or US transceiver 100 communicates with a particular receiving portion 104, FIG. 1A, of its counterpart US or DS transceiver 100 sharing the same communication channel. Accordingly, for DCI system architecture 122, the optical link thereof utilizes a 4-channel coarse wavelength division multiplexing (CWDM) configuration, with a 200 Gb/s data rate for each of the four channels.

In operation of architecture 122, a DS multiplexer 128 multiplexes respective downstream wavelengths from DS transceiver array 124 onto an optical communication medium 130 (an optical fiber, in this example), and demultiplexes respective US wavelengths from medium 130. In a similar manner, a US multiplexer 132 multiplexes the US wavelengths from US transceiver array 126 onto medium 130, and demultiplexes the respective DS wavelengths from medium 130. Because conventional IM-DD links require different wavelengths for US and DS transmission, eight different wavelengths (i.e., four DS wavelengths and four US wavelengths) are required to execute the link of architecture 122.

Thus, for this conventional DCI example based on transceiver 100, in addition to the two multiplexers 128, 132, eight DFBs 106 are required, as well as at least eight MZMs or EAMs 108, eight DACs 112, eight ADCs 118, and eight PDs with TIAs 116. Of these necessary components, DFBs 106 are considered to be the most costly hardware components of the link. Furthermore, 4-lane, 800 Gb/s links typically require the use of more high-performance devices (i.e., high-performing MZMs as opposed to EAMs) having at least a 100 Gbaud symbol rate and/or a bandwidth of 50 GHz or greater.

FIG. 1C is a schematic illustration depicting an alternative conventional DCI system architecture 134 for an 800 Gb/s interface based on conventional transceiver 100, FIG. 1A. Architecture 134 is similar, in structure and functionality, to architecture 122, FIG. 1B, except that architecture 134 illustrates an 8-lane topology, that is, eight transceivers 100 for each of a DS transceiver array 136 and a US transceiver array 138, operating at a 100 Gb/s data rate for each lane or communication channel, as opposed to of the 4 lanes of architecture 122, with each lane at 200 Gb/s. Some conventional DCI topologies utilize the 8-lane configuration instead of the 4-lane configuration, since the former only requires a 50 Gbaud symbol rate. However, the hardware cost of the 8-lane configuration is almost double that of the 4-lane configuration, since eight DS transceivers 100 and eight US transceivers 100 are required for an optical link using a similar DS multiplexer 140, US multiplexer 142, and optical communication medium 144. Furthermore, with eight optical lanes, the yield of critical electrical and optical components (e.g., DFBs 106, ADCs 118, DACs 112, MZMs/EAMs 108, PD/TIAs 116) must be significantly higher than the yield achieved from the 4-lane configuration, since the overall yield drops exponentially as the number of lanes increases.

Accordingly, there is a desire in the industry to increase the data rates achieved in a DCI, but without proportionately increasing the hardware cost or reducing the bandwidth. However, for the next generation of DCI optics that are targeting a 1.6 Tb/s data rate (i.e., double that of the fifth generation DCI optical solution), it has been exceptionally challenging to further double the present-day state-of-the-art data rate using conventional IM-DD-based solutions.

The present inventors have demonstrated that coherent optical technologies overcome many of the challenges arising from IM-DD-based optical technologies. In comparison with IM-DD-based technologies, coherent technologies have been shown to provide superior performance, higher-sensitivity reception, larger split ratios for PONs, an inherent capability for frequency selectivity, and linear field detection enabling full linear channel impairment compensation (e.g., higher tolerances to chromatic dispersion (CD), polarization mode dispersion (PMD), etc.). Additionally, coherent technologies support exceptionally high data throughput over a longer reach deployments (e.g., greater than 50 km), and efficiently utilize spectral resources and enable future network upgrades through the use of multi-level advanced modulation formats. Coherent technology therefore has been proposed as a promising solution for next generation of optical DCI solutions, due to its success in long-haul backbone networks and offers distinct advantages in terms of superior receiver sensitivity, higher spectral efficiency, and flexible channel selection.

Nevertheless, despite the superior performance, the associated complexity and high cost of conventional coherent technology solutions has rendered the adoption of coherent technology into DCI links particularly challenging. For example, the cost of conventional coherent technology systems has been dominated by complex optical and optoelectronic components, such as high-performance tunable lasers and local oscillators (LOs), high-speed and/or complex I/Q modulators, digital signal processing (DSP) chips, polarization optics, etc. A number of innovative solutions to significantly reduce the cost of such coherent optical components, systems, and methods are introduced by the present inventors in related U.S. Pat. No. 10,944,478, issued Mar. 9, 2021, the subject matter of which is incorporated by reference herein in its entirety. Thus, there is a desire in the field to further develop and apply these innovative coherent technology solutions to the DCI optical paradigm.

SUMMARY

In an embodiment, a data center interconnect (DCI) includes a downstream (DS) transceiver array including one or more DS transceivers. The DCI further includes a first comb source in operable communication with the US transceiver array. The first comb source is configured to generate one or more first spaced optical signals. The DCI further includes an upstream (US) transceiver array including one or more US transceivers in operable communication, over an optical communication medium, with the one or more DS transceivers, respectively, of the DS transceiver array. The DCI further includes a second comb source in operable communication with the US transceiver array. The second comb source is configured to generate one or more second spaced optical signals.

In an embodiment, an intelligent transceiver is provided for an optical communication network. The intelligent transceiver includes (i) an input portion configured to obtain an input optical signal source, (ii) first and second intensity modulators configured to modulate first and second amplitude data signals, respectively, onto the input signal source, (iii) first and second phase modulators configured to modulate first and second phase data signals, respectively, onto the input signal source, and (iv) an intelligent processor configured to generate the first and second amplitude data signals and the first and second phase data signals based on knowledge of a receiver disposed downstream of the intelligent transceiver with respect to an optical communication medium.

BRIEF DESCRIPTION

These and other features, aspects, and advantages of the present disclosure will become better understood when the following detailed description is read with reference to the accompanying drawings in which like characters represent like parts throughout the drawings, wherein.

Figure 1A:
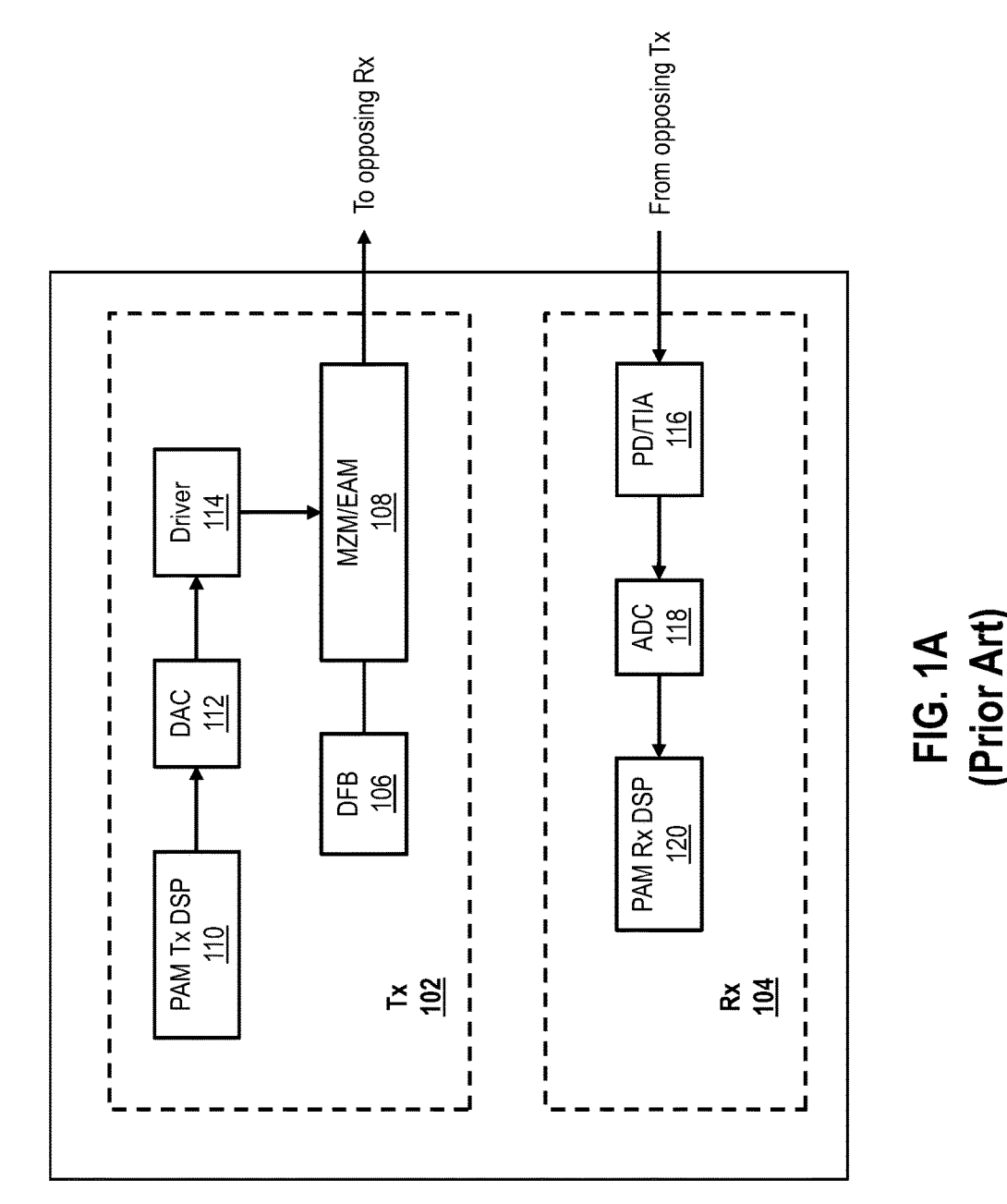
FIG. 1A is a schematic illustration depicting a conventional intensity modulation direct detection transceiver.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object-oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the times of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As described herein, "user equipment," or UE, refers to an electronic device or system utilizing a wireless technology protocol, such as Long Term Evolution (LTE) or WiMAX (e.g., IEEE 802.16 protocols), and may include therein Wi-Fi capability to access and implement one or more existing IEEE 802.11 protocols. A UE may be fixed, mobile, or portable, and may include a transceiver or transmitter-and-receiver combination. A UE may have separate components, or may be integrated as a single device that includes a media access control (MAC) and physical layer (PHY) interface, both of which may be 802.11-conformant and/or 802.16-conformant to a wireless medium (WM).

As used herein, unless specified to the contrary, "modem termination system," or "MTS'" may refer to one or more of a cable modem termination system (CMTS), an optical network terminal (ONT), an optical line terminal (OLT), a network termination unit, a satellite termination unit, and/or other termination devices and systems. Similarly, "modem" may refer to one or more of a cable modem (CM), an optical network unit (ONU), a digital subscriber line (DSL) unit/modem, a satellite modem, etc.

As used herein, the term "transceiver," unless specified otherwise, refers to a P2P or P2MP coherent optics transceiver having a coherent optics transmitting portion and a coherent optics receiving portion. In some instances, the transceiver may refer to a specific device under test (DUT) for several of the embodiments described herein.

As described herein, a "PON" generally refers to a passive optical network or system having components labeled according to known naming conventions of similar elements that are used in conventional PON systems. For example, an OLT may be implemented at an aggregation point, such as a headend/hub, and multiple ONUs may be disposed and operable at a plurality of end user, customer premises, or subscriber locations. Accordingly, an "uplink transmission" refers to an upstream transmission from an end user to a headend/hub, and a "downlink transmission" refers to a downstream transmission from a headend/hub to the end user, which may be presumed to be generally broadcasting continuously (unless in a power saving mode, or the like). The terms "downstream" and "upstream" though, should otherwise be considered relative terms indicating different ends of a communication system.

The person of ordinary skill in the art will understand that the term "wireless," as used herein in the context of optical transmission and communications, including free space optics (FSO), generally refers to the absence of a substantially physical transport medium, such as a wired transport, a coaxial cable, or an optical fiber or fiber optic cable.

As used herein, the term "data center" generally refers to a facility or dedicated physical location used for housing electronic equipment and/or computer systems and associated components, e.g., for communications, data storage, etc. A data center may include numerous redundant or backup components within the infrastructure thereof to provide power, communication, control, and/or security to the multiple components and/or subsystems contained therein. A physical data center may be located within a single housing facility, or may be distributed among a plurality of co-located or interconnected facilities. A 'virtual data center' is a non-tangible abstraction of a physical data center in a software-defined environment, such as software-defined networking (SDN) or software-defined storage (SDS), typically operated using at least one physical server utilizing a hypervisor. A data center may include as many as thousands of physical servers connected by a high-speed network.

As used herein, the term "hyperscale" refers to a computing environment or infrastructure including multiple computing nodes, and having the capability to scale appropriately as increased demand is added to the system, i.e., seamlessly provision infrastructure components and/or add computational, networking, and storage resources to a given node or set of nodes. A hyperscale system, or "hyperscaler" may include hundreds of data centers or more, and may include distributed storage systems. A hyperscale system may utilize redundancy-based protection and/or erasure coding, and may be typically configured to increase background load proportional to an increase in cluster size. A hyperscale node may be a physical node or a virtual node, and multiple virtual nodes may be located on the same physical host. Hyperscale management may be hierarchical, and thus the "distance" between nodes may be physical or perceptual. A hyperscale datacenter may include several performance optimized datacenters (PODs), and each POD may include multiple racks and hundreds and thousands of computing and/or storage devices.

Several embodiments are described herein with respect to various components that may be found in conventional cable, wireless/Wi-Fi, and/or optical networks, which may include, without limitation, an ONT or OLT, and an ONU, and may utilize optical protocols such as Data Over Cable Service Interface Specification (DOCSIS), Ethernet PON (EPON), Radio Frequency over Glass (RFoG), Gigabit PON (GPON), and/or Satellite Internet Protocol, without departing from the scope of the embodiments herein.

Communication systems according to the present embodiments may be further configured for X-hauling traffic, satellite operator communications, MIMO communications, microwave communications, and both short- and long-haul coherent optical communications. As used herein, the terms "xHaul" or "X-hauling" refers to any one, or a combination, of front-hauling, back-hauling, and mid-hauling.

The embodiments described herein provide innovative systems and methods for achieving improved DCI optical solutions, as well as simplified carrier phase estimation (CPE) and carrier phase recovery (CPR) techniques for optical communication systems based on coherent and/or IM-DD technologies. In some embodiments, the coherent optical technologies are leveraged with respect to P2P or P2MP fiber and/or FSO communication links.

The exemplary embodiments are described herein with respect to optical transceivers operating at 100 Gb/s and/or 200 Gb/s. However, the person of ordinary skill in the art will appreciate that such operating parameters are offered by way of example, and not in a limiting sense. Exemplary structures for and algorithmic functionality of a coherent optical transceivers are described in further detail in co-pending U.S. patent application Ser. No. 16/370,873, filed Mar. 29, 2019, the subject matter of which is also incorporated herein by reference.

The innovative principles described herein are further broadly applicable to not only present-day access networks, PONs, and coherent optics systems operating at various transmission speeds, but are also fully adaptable to future-network systems operating at significantly greater transmission speeds and operating parameters, as the demand for increased speed and bandwidth continues to grow. The following examples may also be implemented with respect to FSO and/or fiber links of 50 km and longer.

The following embodiments introduce a number of innovative DCI architectures based on both IM-DD and/or coherent optics. In an exemplary embodiment, optical frequency comb sources are incorporated to reduce the number of required laser sources. In some embodiments, optical full-field transmitters (OFFTs) and phase domain coherent transmitters are incorporated into DCI transceivers to enable operation for not only current generation DCI architectures, but also to enable easy scalability for next generation DCI optical solutions. In particular embodiments, optical frequency comb sources are implemented together with OFFTs and/or phase domain coherent transmitters, which enables even further reductions to the cost of implementing coherent optics for future DCI networks.

Figure 2A:
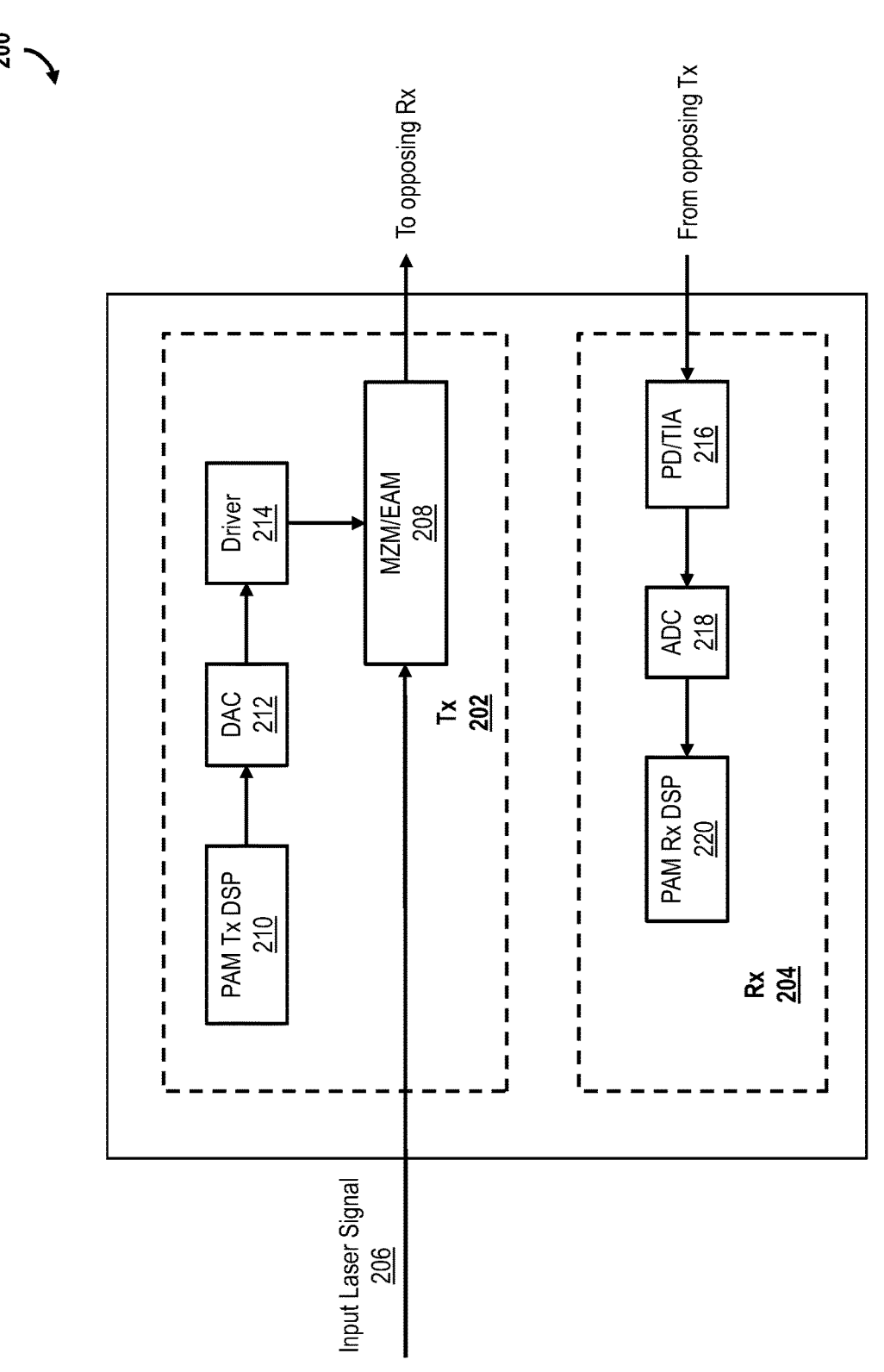
FIG. 2A is a schematic illustration depicting an intensity modulation direct detection transceiver.

FIG. 2A is a schematic illustration depicting an IM-DD transceiver 200. In an exemplary embodiment, transceiver 200 is similar, in many aspects, to conventional transceiver 100, FIG. 1A, and includes a transmitting portion 202 and a receiving portion 204. Transmitting portion 202 differs though, from transmitting portion 102, in that transmitting portion utilizes an external input laser signal source 206 instead of requiring an individual DFB. Transmitting portion 202 may otherwise be substantially similar to transmitting portion 102 in structure and functionality, and further include an MZM/EAM 208, a transmitter DSP 210 (a PAM DSP, in this example), a DAC 212, and a driver 214. Receiving portion 204 is substantially similar to receiver portion 104, FIG. 1A, and includes a PD/TIA 216, an ADC 218, and a receiver DSP 220 (also a PAM DSP, in this example). Implementation of transceiver 200 into exemplary DCI links are described further below with respect to FIGS. 2B-C.

Figure 2B:
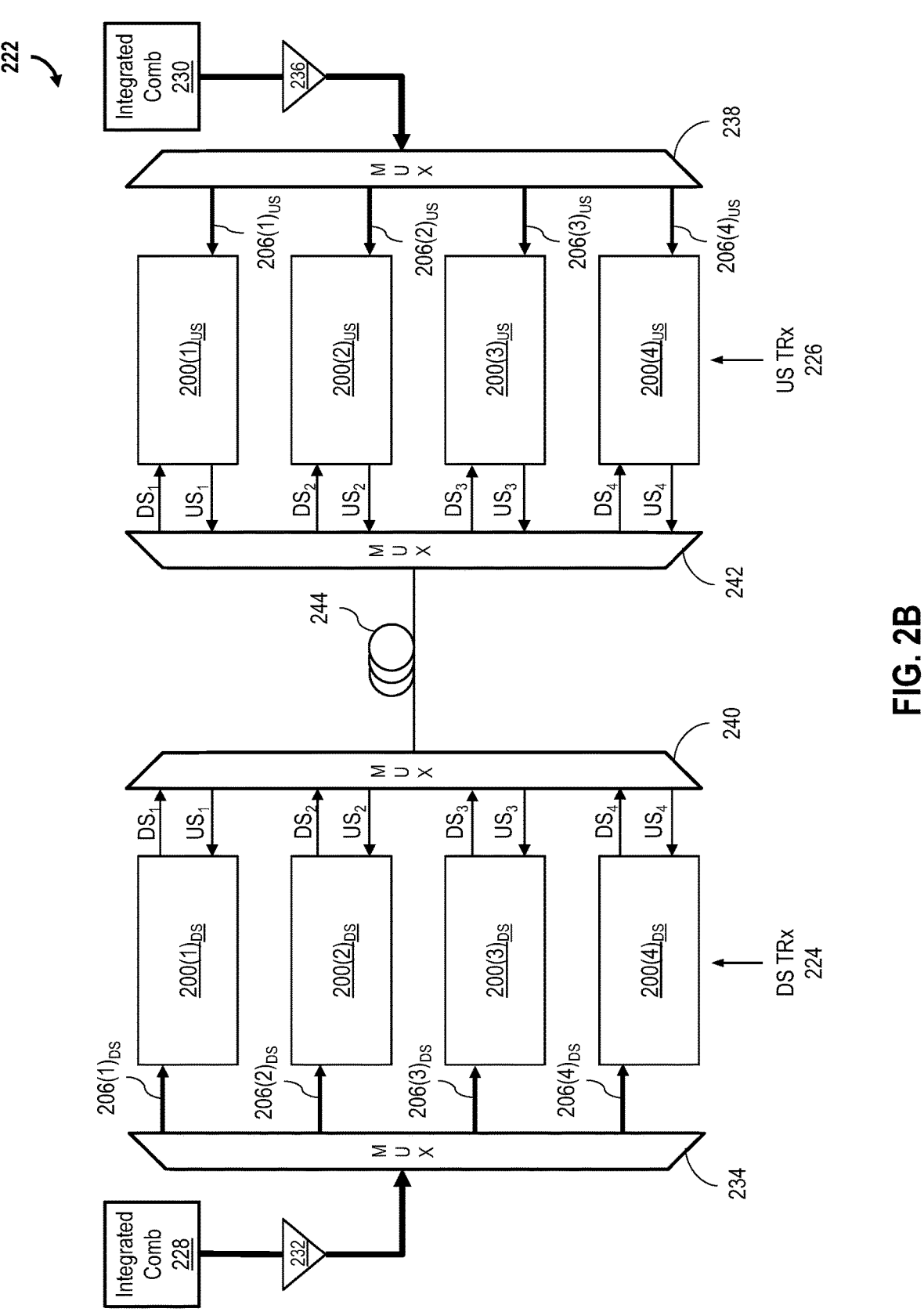
FIG. 2B is a schematic illustration depicting an exemplary data center interconnect system architecture for an 800 Gb/s interface based on the conventional transceiver depicted in FIG. 2A, in accordance with an embodiment.

FIG. 2B is a schematic illustration depicting an exemplary DCI system architecture 222 for an 800 Gb/s interface based on transceiver 200, FIG. 2A. In an exemplary embodiment, architecture 222 illustrates a 4-lane topology for a PAM-based IM-DD, similar to that of conventional architecture 122, FIG. 2A, and includes four DS transceivers 200 for a DS transceiver array 224, where each DS transceiver 200 is in operable communication, respectively, with a counterpart US transceiver 200 of a US transceiver array 226. Architecture 222 differs though, from architecture 122, in that architecture 222 implements a first optical frequency comb source 228 to generate all DS optical wavelengths utilized by DS transceiver array 224, and a second optical frequency comb source 230 to generate all US optical wavelengths utilized by US transceiver array 226, as respective input signals 206.

In the exemplary embodiment, first optical frequency comb source 228 generates a plurality of spaced optical wavelengths, which may be amplified by an optional first amplifier 232, and then are demultiplexed by a first DS multiplexer 234, which separates the spaced DS optical laser signals (four, in this example) for delivery to respective transceivers 200 of DS transceivers 224. In a similar manner, second optical frequency comb source 230 generates an equivalent number (at least four, in this example) of spaced optical wavelengths, optionally amplified by a second amplifier 236, which are then are demultiplexed by a first US multiplexer 238 for separation as individual US optical laser signals fed to respective transceivers 200 of US transceivers 226.

Architecture 222 further includes a second DS multiplexer 204 and a second US multiplexer 242 in operable communication over an optical communication medium 244, over which eight different wavelengths (i.e., four DS wavelengths and four US wavelengths) are communicated.

Figure 1B:
FIG. 1B is a schematic illustration depicting a conventional data center interconnect system architecture for an 800 Gb/s interface based on the conventional transceiver depicted in FIG. 1A.

In an exemplary embodiment, second DS multiplexer 204, second US multiplexer 242, and optical communication medium 244 are substantially similar to DS multiplexer 128, US multiplexer 132, and optical communication medium 130, FIG. 1B.

Accordingly, a 4-lane, 800 Gb/s topology according to architecture 222 substantially improves upon the conventional 4-lane topology if architecture 122, FIG. 1B, by reducing the number of discrete lasers from eight to two. That is, instead of using multiple DFB lasers, the integrated optical frequency comb solution of architecture 222 provides an advantageous solution to significantly reduce the hardware cost in a DCI link. Furthermore, implementation of a dual-comb configuration greatly expands the capacity of the optical spectrum that can be used for data, as opposed to injection-locking and/or control information.

In an exemplary embodiment, one or both of first and second optical frequency comb sources 228, 230 may include a gain switched comb, one or more cascaded electro-optic modulators, a high nonlinear resonator or nano-waveguide, and/or a semiconductor-based comb laser (e.g., a quantum dash/dot laser). In the exemplary embodiment depicted in FIG. 2B, the laser source and comb are depicted as an integrated component or system. The person of ordinary skill in the art will understand that this configuration is provided by way of example, for ease of explanation, and is not intended to be limiting. In some embodiments, the laser source and comb may be separate components.

As described further below with respect to FIG. 2C, the reduction in hardware cost for the DCI link is even more significant as the number of lanes are increased for the DCI link.

Figure 1C:
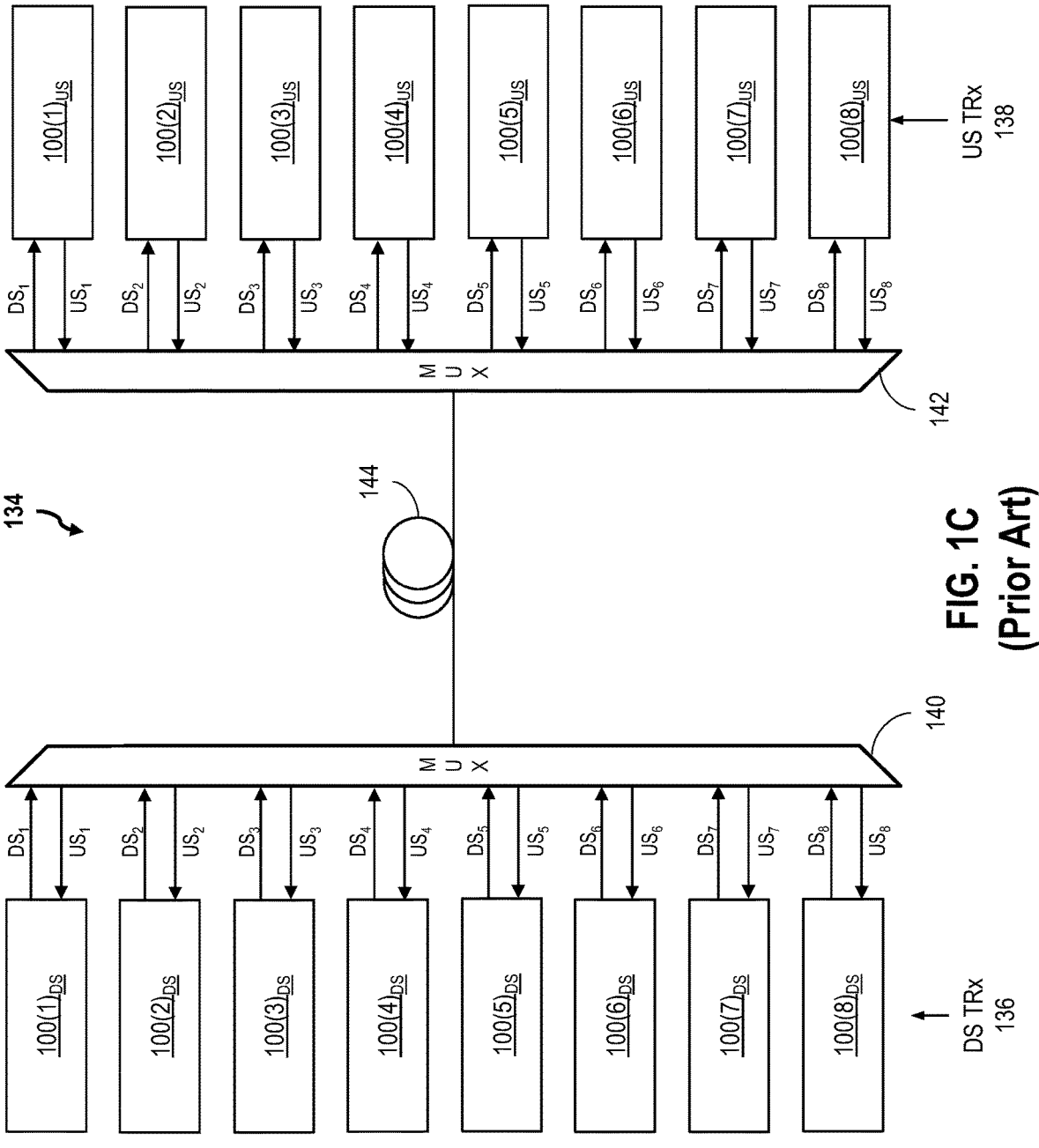
FIG. 1C is a schematic illustration depicting an alternative conventional data center interconnect system architecture for an 800 Gb/s interface based on the conventional transceiver depicted in FIG. 1A.
Figure 2C:
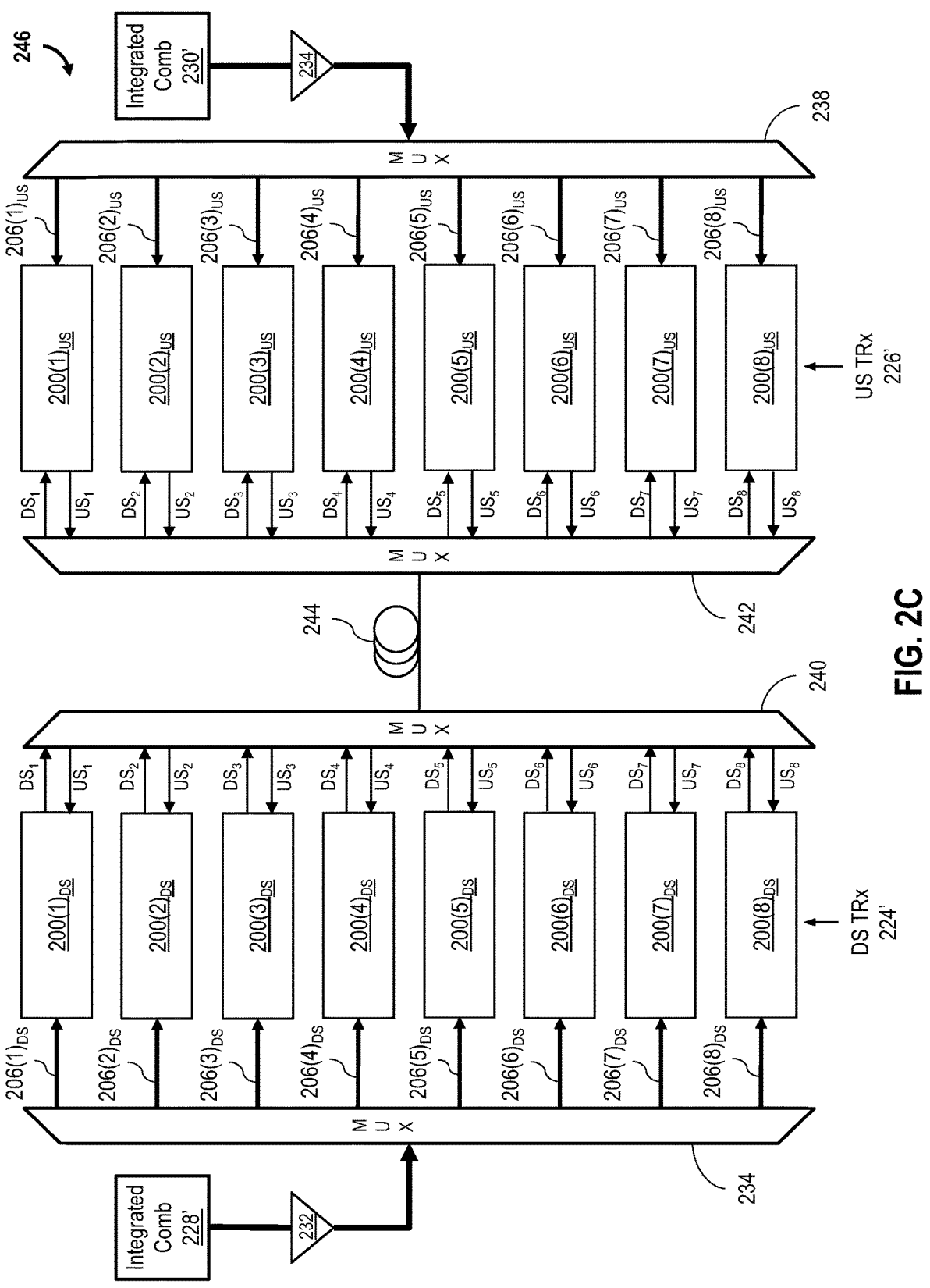
FIG. 2C is a schematic illustration depicting an alternative data center interconnect system architecture for an 800 Gb/s interface based on the transceiver depicted in FIG. 2A, in accordance with an embodiment.

FIG. 2C is a schematic illustration depicting an alternative DCI system architecture 246 for an 800 Gb/s interface based on transceiver 200, FIG. 2A. In the exemplary embodiment, architecture 246 is substantially similar to architecture 222, FIG. 2B, in both structure and function, except that each of DS transceiver array 224' and US transceiver array 226' include 8 individual transceivers 200, and thus both of first and second optical frequency comb sources 228', 230' generate at least eight spaced optical wavelengths. Accordingly, despite the need for higher-yield laser sources in comparison with the 4-lane configuration of architecture 222, a topology according to architecture 246 would only realize the expect increase in hardware cost with respect to two laser sources, instead of the 16 DFBs 106 required for the related 8-lane topology of conventional architecture 134, FIG. 1C.

Nevertheless, although systems and methods according to architectures 222, 246 demonstrate significant improvements over conventional techniques with respect to the IM-DD DCI paradigm, IM-DD technology is not considered a viable solution for next generation DCI links targeting data rates of up to 1.6 Tb/s. As described above, the most recent IM-DD technologies require expensive, high-performance devices and components operating at a 100 Gbaud symbol rate, over DCI topologies using eight or more lanes. Such challenges though, are overcome according to the following embodiments, which implement innovative coherent optical technologies into the emerging DCI paradigm. The coherent optical solutions described herein realize significantly superior performance in comparison with conventional IM-DD techniques, while additionally achieving higher data rates, improved receiver sensitivity, and higher spectral efficiency.

Furthermore, by utilizing the multi-level advanced modulation formats and digital signal processing, the coherent optical solutions herein effectively compensate for linear transmission impairments, such as chromatic dispersion (CD) and/or polarization mode dispersion (PMD), while also more efficiently utilizing the available spectral resources. Whereas conventional coherent optical implementations have been primarily dedicated to long-haul networks, the present inventors have developed significant improvements in design complexity and implementation costs, which enable the application of coherent technologies to short-haul applications, and to the DCI link paradigm in particular.

Figure 3:
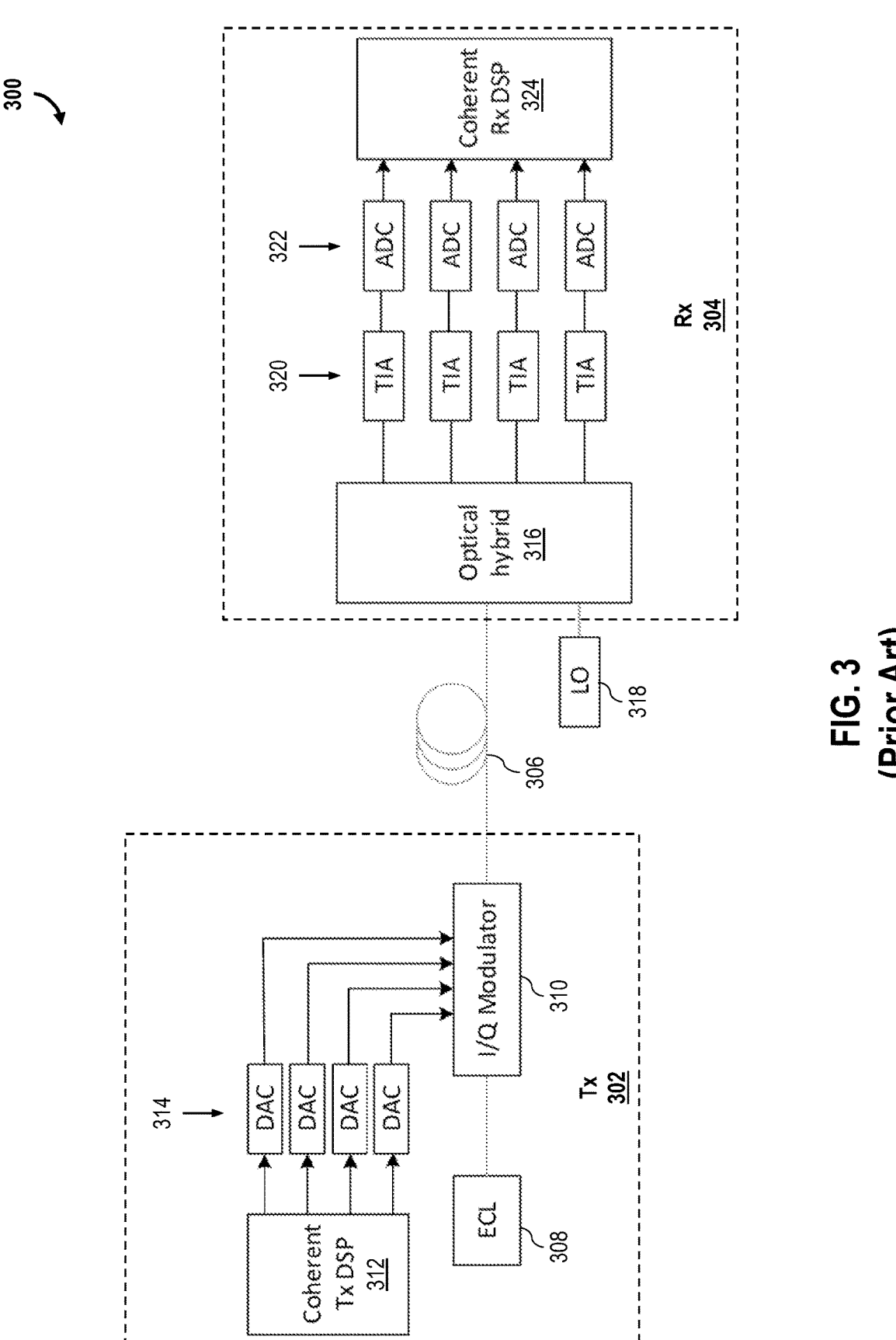
FIG. 3 is a schematic illustration depicting a coherent optical system, in accordance with an embodiment.

FIG. 3 is a schematic illustration depicting a conventional coherent optical system 300. In an exemplary embodiment, coherent transceiver 300 includes a coherent transmitter 302 in communication with a coherent receiver 304 over an optical communication medium 306 (e.g., a single mode fiber (SMF) or FSO). Transmitter 302 includes a laser source 308 (an external cavity laser (ECL), in this example) and an I/Q modulator 310. I/Q modulator 310 modulates, onto a laser from laser source 308, up to four data signals from a coherent transmitter DSP 312, after the data signals are respectively converted by four DACs 314, respectively. The modulated data signals are then aggregated and delivered to optical communication medium 306 for transmission to coherent receiver 304. Coherent receiver 104 receives modulated data signals at an optical hybrid 316 in communication with a local oscillator (LO) signal source 318. Optical hybrid 316 then separates and feeds the four individual data signals to four TIAs 320, respectively, and then each amplified optical signal therefrom is converted into a respective digital signal by one of four ADCs 322 for processing by a coherent receiver DSP 324.

For ease of illustration, conventional coherent optical system 300 is depicted in a single-direction transmission configuration, that is, one coherent transmitter 302 transmitting to one coherent receiver 304. The person of ordinary skill in the art though, will understand that this depiction is provided by way of example, and is not intended to be limiting. For bi-directional transmission over conventional coherent optical system 300, coherent transmitter 302 may constitute a portion of a first coherent transceiver (not shown) including its own coherent receiving portion (also not shown) having a structural configuration substantially similar to coherent receiver 304, and coherent receiver 304 may constitute a portion of a second coherent transceiver (not shown) including its own coherent transmitting portion (also not shown) substantially similar to transmitter 302.

In such a bi-directional configuration, the number of key components (e.g., ECLs 308, DACs 314, etc.) for conventional coherent optical system doubles, thereby making cost a major ongoing hurdle that has prevented adoption of large-scale coherent optics deployments in short-haul networks. Conventional coherent optics deployments have, for this reason, been implemented primarily with respect to the long-haul and metro network paradigms.

Figure 4:
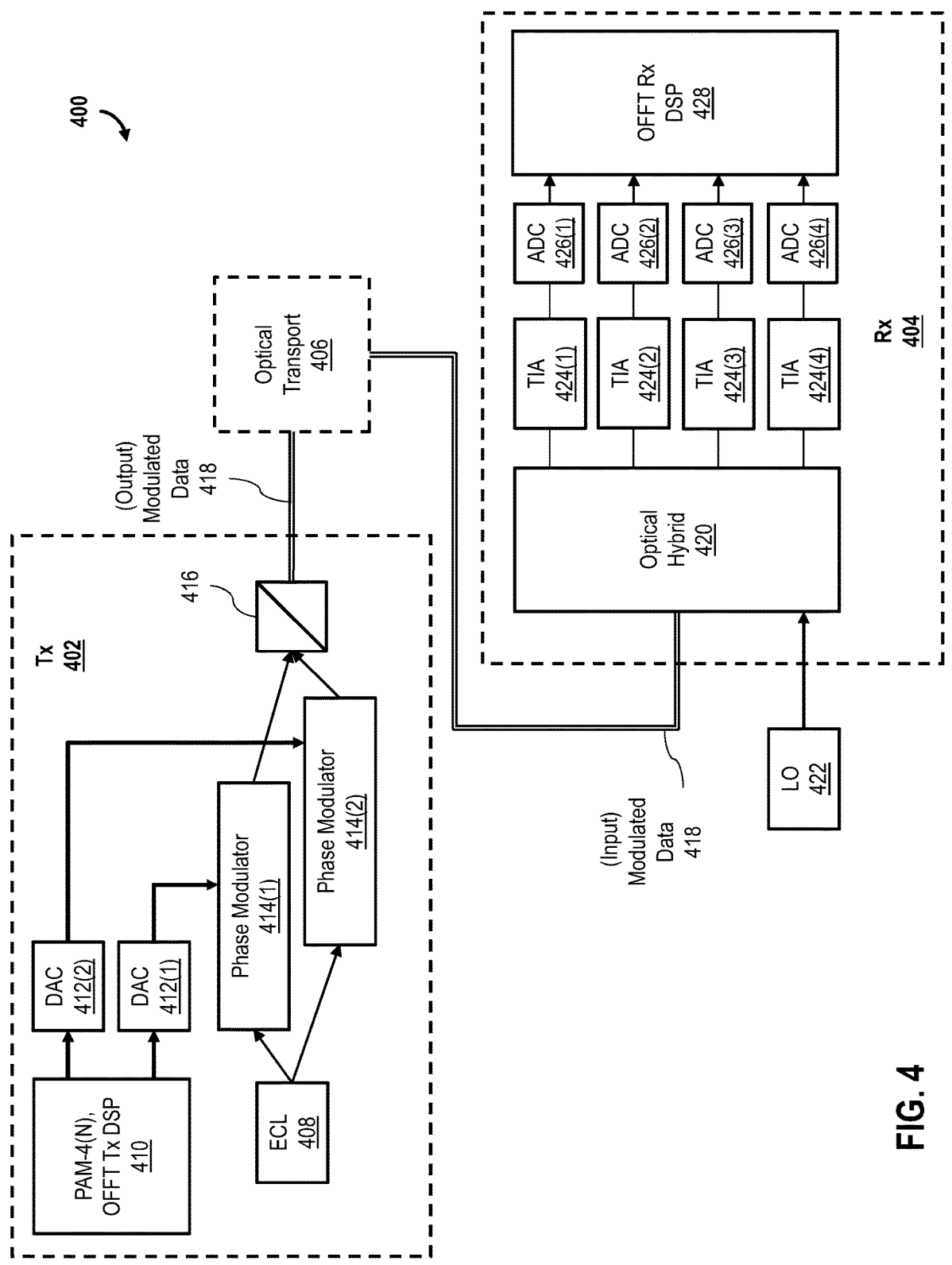
FIG. 4 is a schematic illustration depicting an alternative coherent optical system, in accordance with an embodiment.

FIG. 4 is a schematic illustration depicting an alternative coherent optical system 400. Coherent optical system 400 is similar, in some aspects, to conventional coherent optical system 300, FIG. 3, and includes a coherent transmitter 402 and a coherent receiver 404 in operable communication over an optical transport medium 406. Coherent optical system 400 differs though, from conventional coherent optical system 300, in that transmitter 402 is configured as an OFFT. OFFT operational principles, as well as exemplary systems and methods for optical injection locking (OIL)-based OFFTs, are described in further detail in U.S. Pat. No. 11,418,263, issued Aug. 16, 2022 to the present inventors, the subject matter of which is incorporated herein by reference in its entirety.

In an exemplary embodiment, OFFT 402 includes an input laser source 408. In this example, input laser source 408 is illustrated as an integral component of OFFT 402. Nevertheless, as described further below with respect to FIG. 5, input laser source 408 may alternatively be external to OFFT 402. OFFT 402 further includes an OFFT transmission DSP 410 in communication with two DACs 412. OFFT 402 further includes two phase modulators 414 in communication with the two DACs 412, respectively, and are also in communication with input laser source 408. Respective outputs of phase modulators 414 are combined by a combiner 416 for delivery to optical transport medium 406 as an aggregated modulated data signal 418. Modulated data signal 418 is then received by an optical hybrid 420 of coherent receiver 404, which is also in communication with an LO signal source 422. In an exemplary embodiment, coherent receiver 404 may be substantially similar to coherent receiver 304, FIG. 3, and includes a plurality (e.g., four) of TIAs 424 and ADCs 426, as well as a coherent (OFFT) reception DSP 428.

In the exemplary embodiment depicted in FIG. 4, coherent optical system 400 is illustrated, for ease of explanation, for single-direction communication, with input laser source 408 constituting an internal component of OFFT 402 (i.e., one laser source per transmitter). An external laser source for an OFFT is described further below with respect to FIG. 5.

Figure 5:
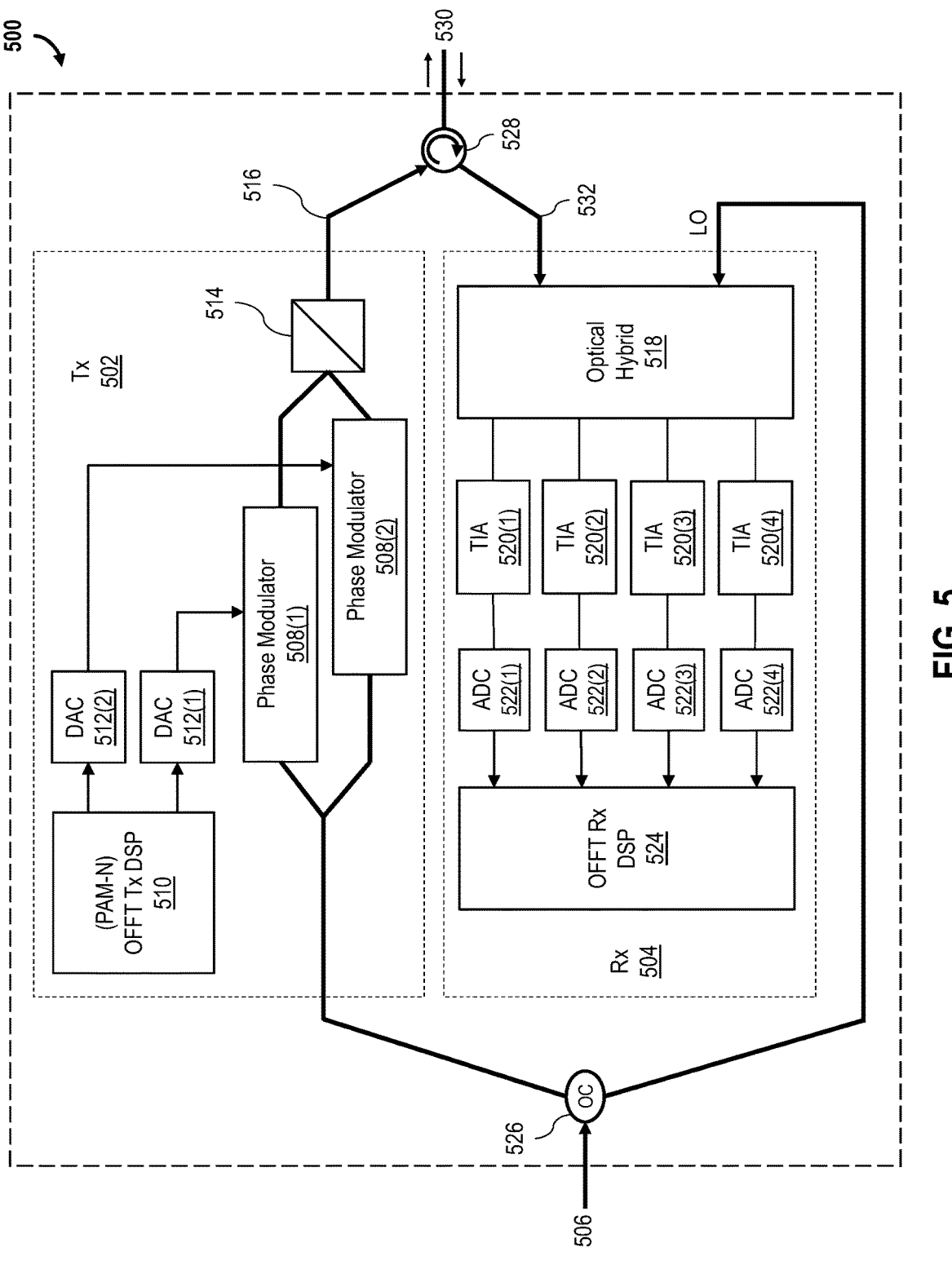
FIG. 5 is a schematic illustration depicting an exemplary coherent transceiver, in accordance with an embodiment.

FIG. 5 is a schematic illustration depicting an exemplary coherent transceiver 500. In an exemplary embodiment, coherent transceiver 500 includes a coherent transmitter 502 and a coherent receiver 504. Coherent transmitter 502 is similar to OFFT 402, FIG. 4, except that coherent transmitter 502 utilizes an external laser source 506 as the input to phase modulators 508 (two phase modulators 508, in this example). Coherent transmitter 502 is otherwise substantially similar to OFFT 402, and includes an OFFT transmission DSP 510 in communication with two DACs 512, which are in turn respectively in communication with phase modulators 508. Also similar to OFFT 402, coherent transmitter 502 further includes a combiner 514 for combining the outputs from phase modulators 508 into an aggregated modulated signal 516.

In an embodiment, coherent receiver 504 is substantially similar to coherent receiver 404, FIG. 4, and includes an optical hybrid 518, four TIAs 520 in communication with four ADCs 522, respectively, and a coherent (OFFT) reception DSP 524. Coherent receiver 504 differs though, from coherent receiver 404, in that optical hybrid 518 obtains the LO signal from the same external laser source 506 used by phase modulators 508. That is, in an exemplary embodiment, coherent transceiver 500 may further include an optical coupler 526 for providing optical signal(s) from external laser source 506 to both of phase modulators 508 and optical hybrid 518.

Additionally, coherent transceiver 500 may further include an optical circulator 528 in operable communication with each of combiner 514, optical hybrid 518, and an optical transport medium 530. Optical circulator 528 may, for example, be configured as a 3-port circulator enabling two-way communication with optical transport medium 530, but only one-way communication of aggregated modulated signal 516 from combiner 514 and of an opposing modulated data signal 532 to optical hybrid 518. In one or more of the exemplary embodiments described below, coherent transceiver 500 may be configured as an OIL-based OFFT transceiver.

An OFFT based on coherent optics transceiver 500 is therefore of particular usefulness with respect to the DCI paradigm due to its ability to significantly improve the efficiency and reduce the cost of coherent technology in short-haul networks. By simplifying the design of the coherent transmitter e.g., coherent transmitter 502) for multi-level signal modulation and equalization in the phase domain, the overall complexity of the device is greatly reduced. Accordingly, an OFFT based on coherent transceiver 500 will achieve significantly less insertion/modulation loss in comparison with an I/Q modulator-based transmitter or transceiver system. For example, in comparison with a conventional coherent transceiver or system (e.g., system 300, FIG. 3), which typically requires eight DACs (e.g., DACs 314, FIG. 3) and two I/Q modulators (e.g., I/Q modulators 310, each including eight phase modulators apiece) for two-transceiver bi-directional communication, the phase domain-based architecture of coherent transmitter 502 would only require four DACs 512 and four phase modulators to accomplish the same bi-directional topology, as described further below with respect to FIGS. 6A-C.

Figure 6A:
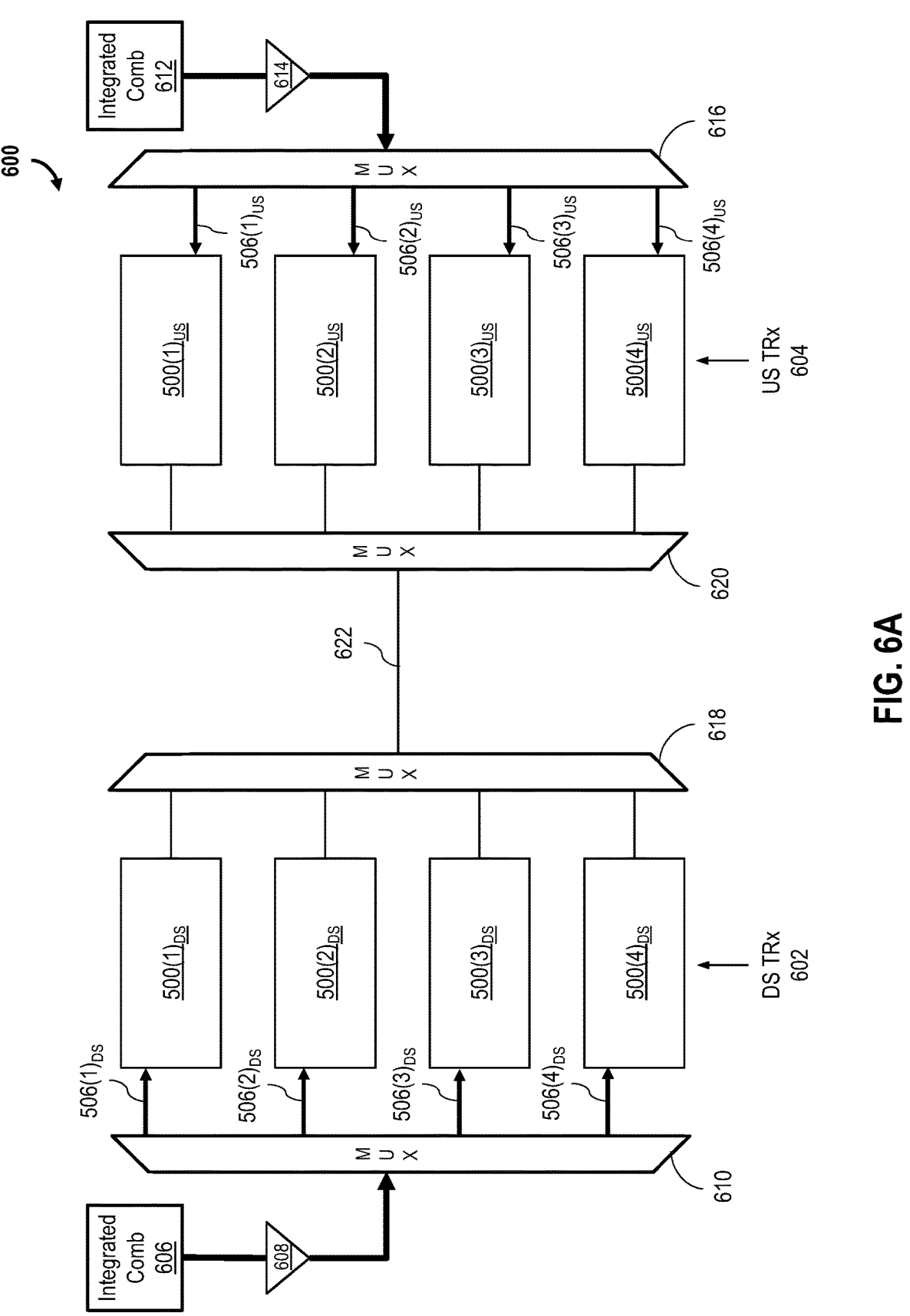
FIG. 6A is a schematic illustration depicting an exemplary data center interconnect system architecture for a 1.6 Tb/s interface, in accordance with an embodiment.

FIG. 6A is a schematic illustration depicting an exemplary DCI system architecture 600 for a 1.6 Tb/s interface. In an exemplary embodiment, architecture 600 depicts a comb-based coherent WDM DCI link utilizing coherent transceiver 500, FIG. 5, (including phase domain coherent transmitter 502) as a primary component for an ultra-high bandwidth DCI (i.e., 1.6 Tb/s). In the exemplary embodiment depicted in FIG. 6A, architecture 600 is illustrated as having a 4-lane topology for a CWDM coherent DCI link. Architecture 600 is therefore similar to architecture 222, FIG. 2B, in overall topology, having a DS transceiver array 602 including four individual DS coherent transceivers 500, and a US transceiver array 604 including four corresponding individual US coherent transceivers 500, respectively.

The remaining topology of architecture 600 is substantially similar, in structure and function, to architecture 222, FIG. 2B, and includes a first integrated comb source 606 and an optional first amplifier 608 in communication with a first DS multiplexer 610, from which individual respective DS coherent transceivers 500 obtain a particular DS wavelength as an input/external laser source signal 506. Architecture 600 further includes a second integrated comb source 612 and optional amplifier 614 in communication with a first US multiplexer 616, from which individual respective US coherent transceivers 500 obtain their individual US wavelength input/external laser source signal 506. Architecture 600 further includes a second DS multiplexer 618 in operable communication with a second US multiplexer 620 over an optical communication medium 622.

In the exemplary embodiment depicted in FIG. 6A, architecture 600 utilizes a 4-lane topology for a next generation 1.6 Tb/s DCI link. Accordingly, utilizing a DP-QPSK modulation format, with a PAM-4 driving signal, for example, each individual wavelength of a particular lane may operate at a 400 Gb/s data rate using 100 Gbaud phase modulators 508 and PAM-4 OFFT DSPs 510. For this embodiment, a 4-level PAM-4 signal/OFFT is described by way of example, and is not intended to be limiting. As described further below, the person of ordinary skill in the art will understand that other multi-level signals and/or modulation formats may be implemented with respect to the present embodiments without departing from the scope thereof.

Figure 6B:
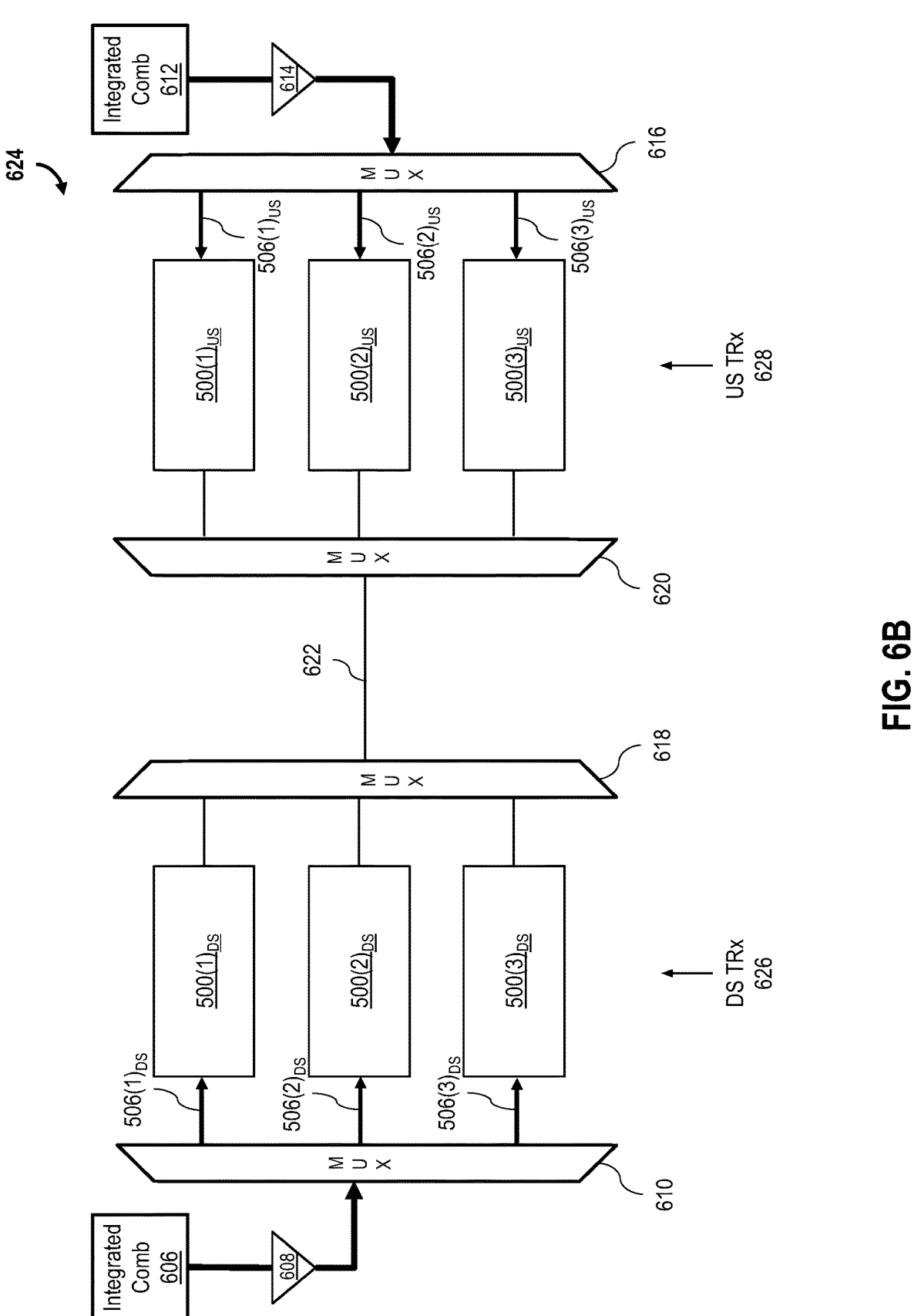
FIG. 6B is a schematic illustration depicting an alternative data center interconnect system architecture for a 1.6 Tb/s interface, in accordance with an embodiment.

FIG. 6B is a schematic illustration depicting an alternative DCI system architecture 624 for a 1.6 Tb/s interface. In the exemplary embodiment depicted in FIG. 6B, architecture 624 is substantially similar to architecture 600, FIG. 6A, except that architecture 624 implements a 3-lane topology instead of the 4-lane topology of architecture 600. Accordingly, for architecture 624, a DS transceiver array 626 includes three individual DS coherent transceivers 500, and a US transceiver array 628 similarly includes three corresponding individual US coherent transceivers 500. Architecture 624 thus represents an exemplary embodiment of a phase domain coherent signal transmitter (e.g., coherent transmitter 500/OFFT DSP 510) utilizing a DP-8PSK modulation format, i.e., a PAM-8 driving signal.

Architecture 624 may, for example, be preferable to architecture 600 in the case where noise performance is less of a concern, or in the case where may be desirable trade-off noise performance for the higher modulation format utilized in architecture 624, which enables the use of fewer wavelengths, and thus less total required hardware for the associated communication lanes thereof. In some embodiments, architecture 624 may be particularly useful for shorter link distances, and comparison with architecture 600, which may be preferable for longer link distances.

Figure 6C:
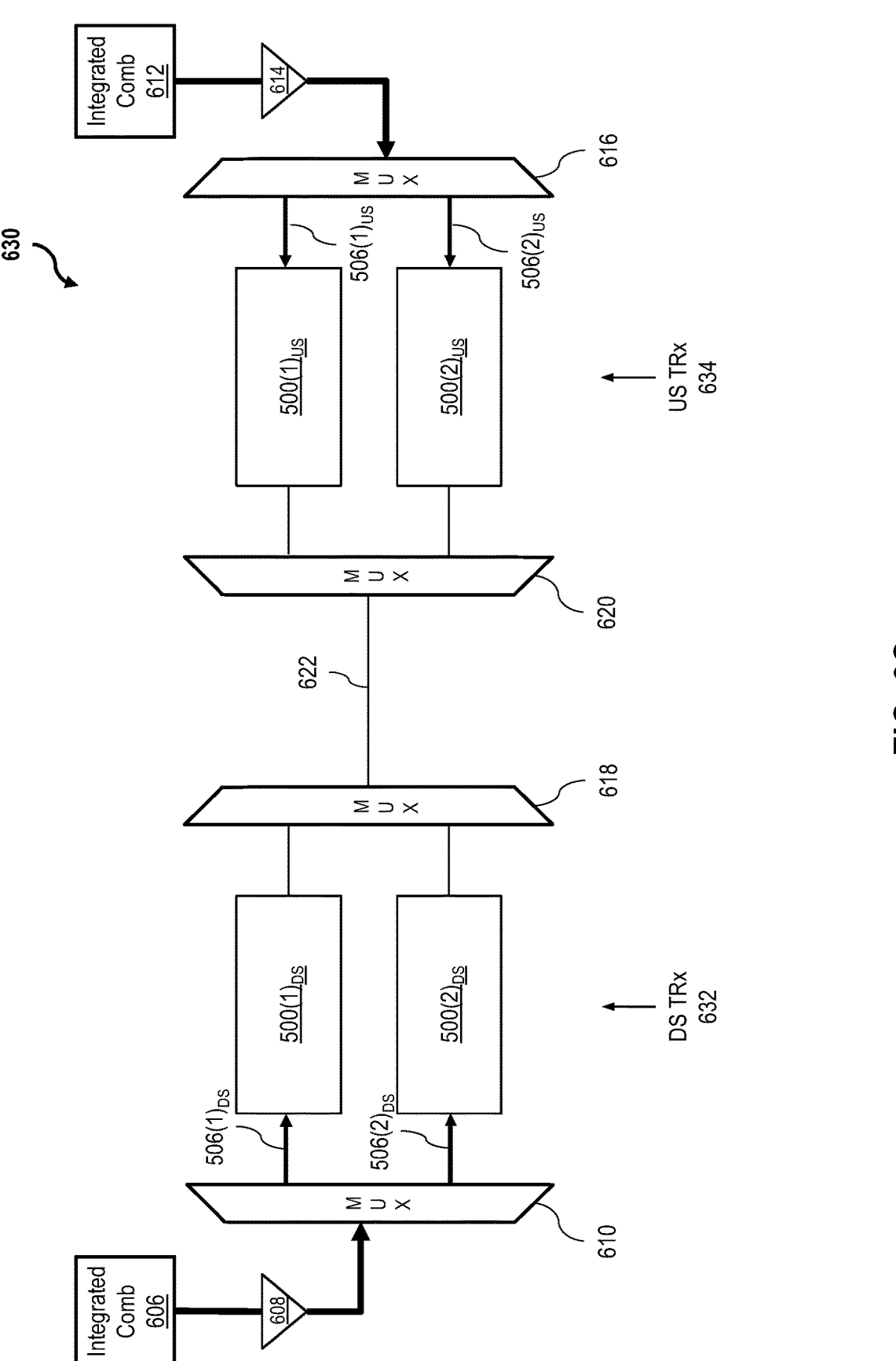
FIG. 6C is a schematic illustration depicting an alternative data center interconnect system architecture for a 1.6 Tb/s interface, in accordance with an embodiment.

FIG. 6C is a schematic illustration depicting an alternative DCI system architecture 630 for a 1.6 Tb/s interface. In the exemplary embodiment depicted in FIG. 6C, architecture 630 is substantially similar to architecture 600, FIG. 6A, and architecture 624, FIG. 6B, except that architecture 630 implements a 2-lane topology instead of the 3- or 4-lane topologies described above. Accordingly, for architecture 630, a DS transceiver array 632 includes two individual DS coherent transceivers 500, and a US transceiver array 634 similarly includes two corresponding individual US coherent transceivers 500. Architecture 630 thus represents an exemplary embodiment of a phase domain coherent signal transmitter utilizing a DP-16PSK modulation format, i.e., a PAM-16 driving signal. Architecture 630 may, for example, be of particular use in the case where even higher modulation formats are desired, thereby further reducing the number of wavelengths and associated hardware therefor, and particularly in the case of even shorter link distances.

The embodiments herein thus demonstrate an innovative systems and methods that are both adaptable and scalable for a variety of modulation formats, data rates, and other operational parameters, and for short, medium, and long link distances. Additionally, the present embodiments are further capable of leveraging the full-duplex (FDX) capabilities of coherent technologies that enable use of the same wavelength for both US and DS transmission. Accordingly, the person of ordinary skill in the art will understand that the innovative systems and methods herein may be implemented with respect to FDX communication, or with respect to non-FDX communication where the corresponding US and DS transmissions use different respective wavelengths.

Figure 7A:
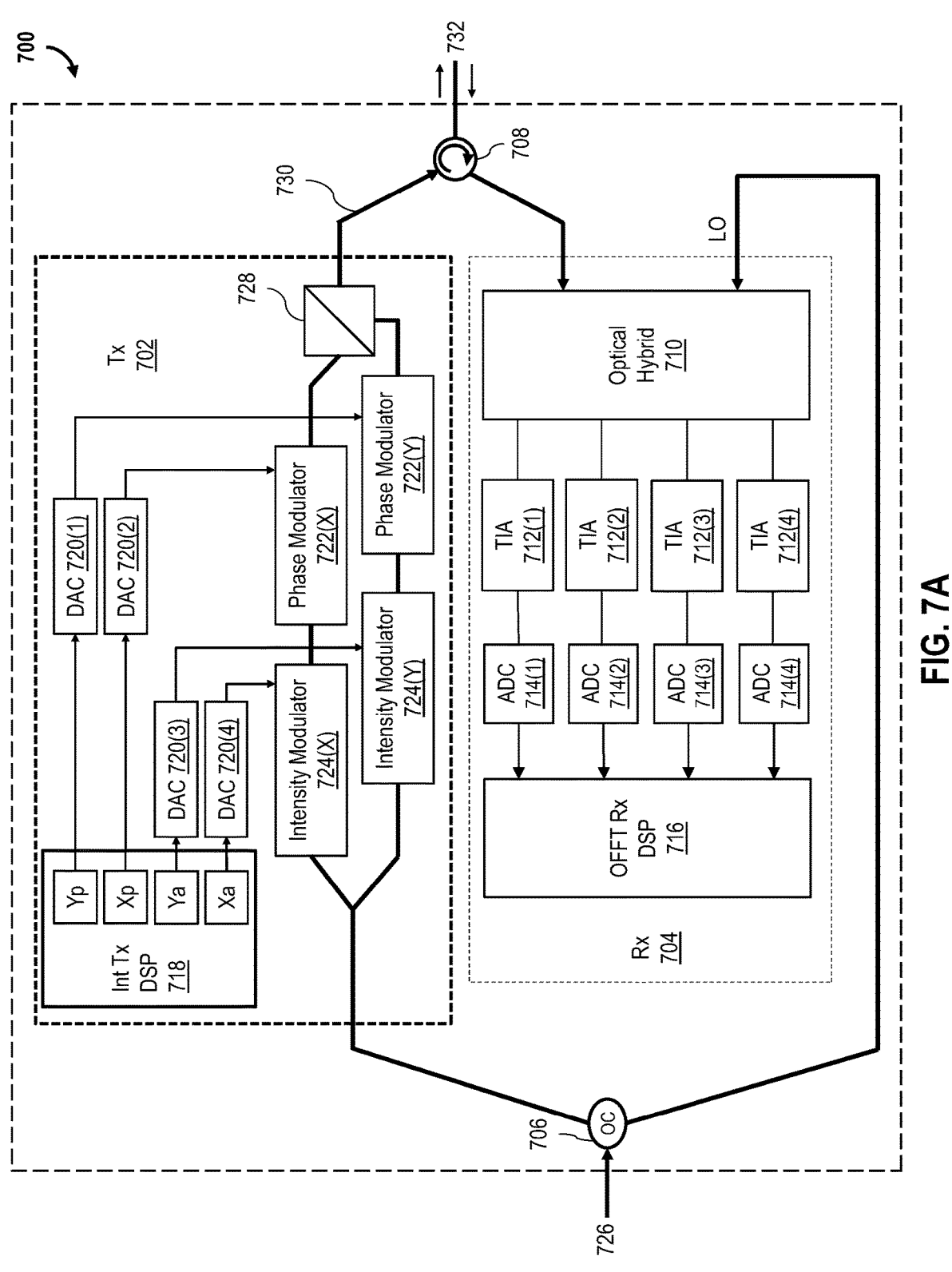
FIG. 7A is a schematic illustration depicting an alternative coherent transceiver, in accordance with an embodiment.

FIG. 7A is a schematic illustration depicting an alternative coherent transceiver 700. In an exemplary embodiment, coherent transceiver 700 is similar, in many aspects, to coherent transceiver 500, FIG. 5, and includes a coherent transmitter 702 and a coherent receiver 704 sharing and/or coordinating optical signals using an optical coupler 706 and an optical circulator 708. In an exemplary embodiment, coherent receiver 704 is substantially similar to coherent receiver 504, FIG. 5, and includes an optical hybrid 710, four TIAs 712 in communication with four ADCs 714, respectively, and a coherent (OFFT) reception DSP 716.

Coherent transmitter 702 differs from coherent transmitter 502, FIG. 5, in that, instead of a dedicated DSP (e.g., transmission DSP 510, FIG. 5), coherent transmitter 702 includes an intelligent processor (e.g., DSP) configured to generate respective dual-polarization amplitude and phase data signals Xa, Ya, Xp, Yp into four respective DACs 720, i.e., one DAC 720 for the amplitude data signal (e.g., Xa/Ya)

or phase data signal (e.g., Xp/Yp) of the X- and Y-polarizations. In an exemplary embodiment, each DAC 720 is further in operable communication, respectively, with one of two phase modulators 722 or one of two intensity modulators 724. More particularly, the DAC (e.g., DAC 720(1)) converting the phase data Yp for the Y-polarization feeds into the phase modulator (e.g., phase modulator 722(Y)) for the Y-polarization, etc.

In exemplary operation, each of intensity modulators 724 receives an input laser signal 726 (from an external source, and this example) and separately executes a first-stage amplitude modulation on one of the two polarizations using the converted amplitude data signals (e.g., Xa and Ya). The outputs from intensity modulators 724 are then fed to the respective phase modulator 722 for that polarization, and phase modulators 722 then separately executes a second-stage phase modulation on the received signals using the converted phase data signals (e.g., Xp and Yp). The outputs from phase modulators 722 are then aggregated by combiner 728 into an aggregated amplitude-and-phase-modulated signal 730, which may then be provided to an optical communication medium 732 by optical circulator 708. In an embodiment, one or both of intensity modulators 724 may include a direct-modulated child laser injection-locked the parent laser source of input laser signal 726.

Exemplary systems and methods for two-stage amplitude-and-phase modulating coherent transmitters are described in further detail in related U.S. Pat. No. 11,418,263, issued Aug. 16, 2022 to the present inventors, and also in co-pending U.S. patent application Ser. No. 17/827,581, filed May 27, 2022, the subject matter of which is incorporated by reference herein in its entirety. Exemplary implementations of transceiver 700 within the DCI paradigm are described further below with respect to FIGS. 7B-C.

The versatile configuration of intelligent processor 718 enables transceiver 700 to flexibly operate as a "universal transceiver" that, with knowledge of the type and/or operation of an opposing receiver and associated transceiver, is capable of bi-directional communication with that opposing transceiver without any required structural reconfiguration. For example, in the case of an opposing transceiver configured for only single-polarization, IM-DD operation, intelligent processor 718 may be configured to zero out phase data components Xp and Yp, and then provide the same data for each of amplitude data components Xa and Ya. Through such intelligent data allocation techniques, transceiver 702 effectively operates as an IM-DD transceiver, e.g., similar to the functionality of transceiver 200, FIG. 2A. Accordingly, transceiver 700 is enabled to easily communicate with existing legacy transceivers capable of only single-polarization intensity modulation.

The versatility of transceiver 700 is further demonstrated in the case where the opposing transceiver is (or is upgraded to) a dual-polarization (DP) IM-DD transceiver. In this case, intelligent processor may still zero out the phase data components Xp and Yp, but provide different amplitude data components Xa and Ya for the two respective X- and Y-polarizations. The zeroing out of the phase data is possible for transceiver 700 because the intensity modulation is decoupled from the phase modulation. As opposing transceivers are further upgraded for multi-level PAM4+ and QAM operation (e.g., DP X- and Y-components, and I/Q intensity/phase components in an OFFT), intelligent processor 718 is able to provide different intensity and phase data to all modulators 722, 724 for highest capacity operation.

Figure 7B:
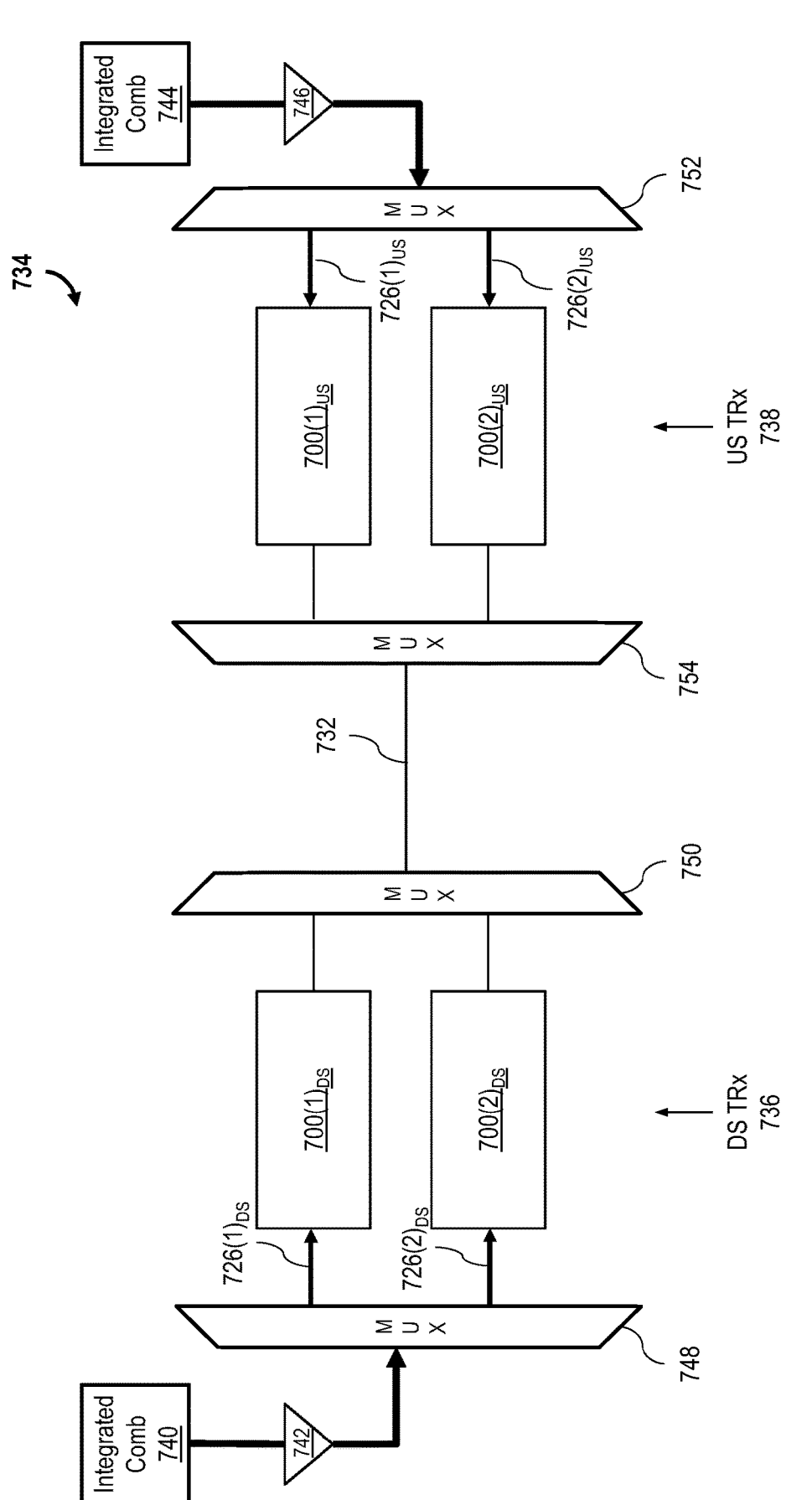
FIG. 7B is a schematic illustration depicting an alternative data center interconnect system architecture for a 1.6 Tb/s interface, in accordance with an embodiment.

The versatility of transceiver 700 is thus of particular value to the DCI paradigm, since the more centralized DS operation may be established for highest capacity operation, irrespective of the US capability, but is immediately adaptable to ongoing upgrades to the US operation. In this manner, US operators are encouraged to upgrade the capabilities of their respective transceivers at the earliest convenience. Utilization of intelligent transceivers 700 further enables, not only the processing of conventional two-dimensional constellations for QAM operation, but also the straightforward integration of artificial intelligence (AI) techniques for processing asymmetric and/or remapped constellations. That is, because some AI machines are not limited by symmetric constellations, transceiver 700 is particularly FIG. 7B is a schematic illustration depicting an alternative DCI system architecture 734 for a 1.6 Tb/s interface. In an exemplary embodiment, architecture 734 has a substantially similar 2-lane topology as architecture 630, FIG. 6C, except that architecture 734 utilizes two coherent transceivers 700, FIG. 7A, each for both of a DS transceiver array 736 and a US transceiver array 738, and implements a 16QAM modulation format for each of a DS integrated comb source 740 (and optional DS amplifier 742) and a US integrated comb source 744 (and optional US amplifier 746). In the exemplary embodiment, architecture 734 further includes a first DS multiplexer 748, a second DS multiplexer 750, a first US multiplexer 752 and a second US multiplexer 754, all of which may operate in a similar manner as the components described above using the same respective labels. Architecture 734 thus represents how the systems and methods described herein are easily scalable for comb-based coherent WDM DCI links utilizing higher modulation format (16QAM, in this example) OFFTs for ultra-high bandwidth (e.g., 1.6 Tb/s or greater) DCI links.

In an embodiment, the use of higher-order QAM modulation formats enable the encoding more bits per symbol, which in turn may result in one or both of (i) the reduction of the number of necessary optical and electronic components, and (ii) enabling the effective use of lower-bandwidth (e.g., less expensive) components. As described above, the versatile topology of architecture 734 enables system designers to optimize the number of lanes, modulation format, and hardware cost against such consideration as noise tolerance and/or other optical impairments. In the exemplary embodiment depicted in FIG. 7B, utilization of a higher-order QAM (16QAM, in this example) enables a reduction in the number of optical lanes from four lanes to two lanes, but while still maintaining the target data rate of 1.6 Tb/s.

Figure 7C:
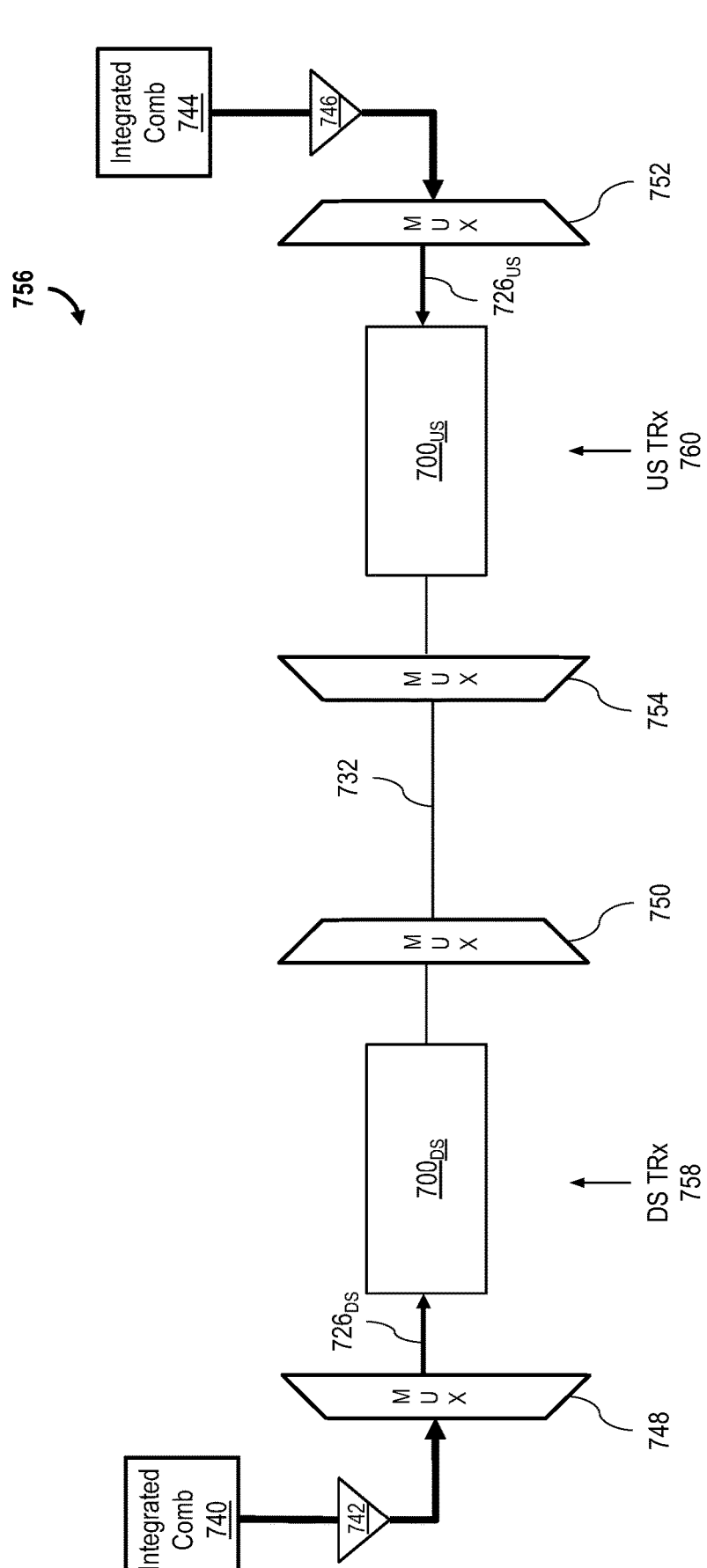
FIG. 7C is a schematic illustration depicting an alternative data center interconnect system architecture for a 1.6 Tb/s interface, in accordance with an embodiment.

FIG. 7C is a schematic illustration depicting an alternative DCI system architecture 756 for a 1.6 Tb/s interface. In an exemplary embodiment, architecture 756 has a substantially similar topology as architecture 734, FIG. 7B, except that integrated comb sources 740, 744 are configured to implement a 64QAM modulation format, and architecture 756 includes only a single coherent transceiver 700, FIG. 7A, for each of a DS transceiver array 758 and a US transceiver array 760. Architecture 756 thus further confirms the principles described above, namely, how the implementation of even higher-order modulation formats (64QAM, in this example) enable even further reductions to the number of optical lanes (from two lanes to a single lane, in this example), but without sacrificing the target data rate of 1.6 Tb/s. For the single-lane configuration depicted in FIG. 7C, multiplexers 748, 750, 752, 754 may be optional. The inclusion of such additional components, however, enables easy integration, reconfiguration, and/or scalability of architecture 756 with respect to other DCI architectural topologies.

In some embodiments, either or both of architectures 734, 756 may be implemented with respect to FDX communications. In other embodiments, either or both of architectures 734, 756 may be readily applied to non-FDX communications or networks.

Figure 8:
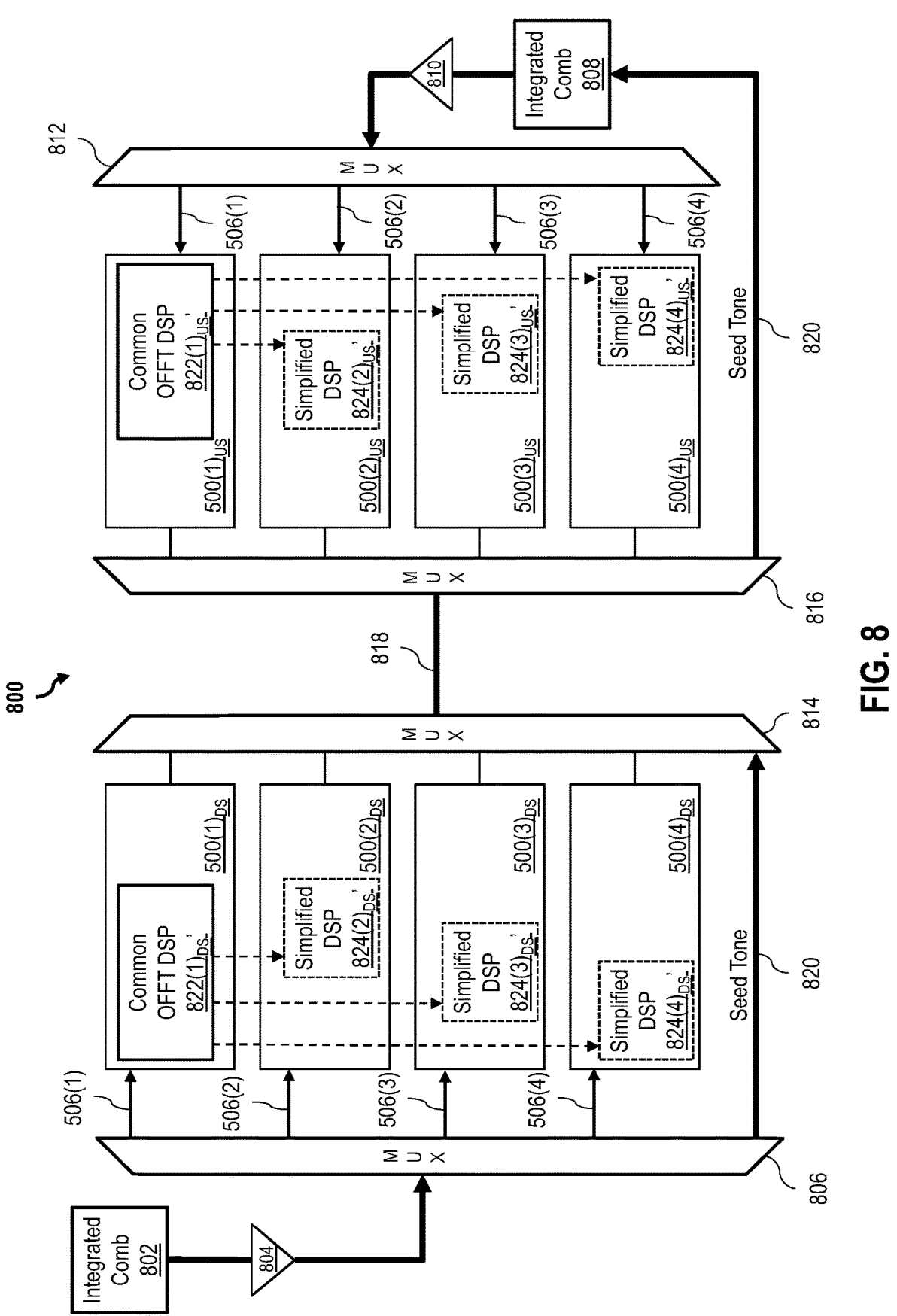
FIG. 8 is a schematic illustration depicting an exemplary phase-synchronized comb-based data center interconnect system architecture, in accordance with an embodiment.

FIG. 8 is a schematic illustration depicting an exemplary phase-synchronized comb-based DCI system architecture 800. In an exemplary embodiment, architecture 800 has 4-lane topology for a 1.6 Tb/s interface similar to architecture 600, FIG. 6A, and includes four DS coherent transceivers 500 in communication with four opposing US coherent transceivers 500, respectively. Also similar to architecture 600, architecture 800 further includes (i) a first integrated comb source 802 and an optional first amplifier 804 in communication with a first DS multiplexer 806, from which individual respective DS coherent transceivers 500 obtain a particular DS wavelength as an input/external laser source signal 506, and (ii) a second integrated comb source 808 and optional amplifier 810 in communication with a first US multiplexer 812, from which individual respective US coherent transceivers 500 obtain their individual US signals 506. Architecture 800 further includes a second DS multiplexer 814 in operable communication with a second US multiplexer 816 over an optical communication medium 818.

Architecture 800 differs from architecture 600, in that first integrated comb source 802 generates, in addition to the space optical wavelengths/laser signals 506, a seed tone 820 that is passed from first DS multiplexer 806 to second DS multiplexer 814, over optical communication medium 818, and through second US multiplexer 816, from which seed tone 820 may be directly fed to second integrated comb source 804. In this manner, seed tone 820 enables second integrated comb source 804 to generate spaced US signals 506 matching their counterpart DS signals 506. That is, US signals 506 utilize the same optical frequency wavelengths as their counterpart DS signals 506, thereby nearly halving the number of individual optical frequencies required for bidirectional communication over architecture 800 (i.e., five total frequency wavelengths including seed tone 820, as opposed to the eight frequencies that would be required without seed tone 820).

As described above, first optical frequency comb source 802 is capable of generating multiple optical tones and, according to architecture 800, one such tone (e.g., seed tone 820) is utilized as a seed tone that enables second optical frequency comb source 808 to generate multiple optical tones at the same frequency wavelengths, respectively, as those generated by first optical frequency comb source 802 (i.e., other than seed tone 820). Exemplary systems and methods for dual-comb, bi-directional optical communication using seeds tones are described in further detail in co-pending U.S. patent application Ser. No. 17/526,341, filed Nov. 15, 2021, the disclosure of which is incorporated herein by reference in its entirety. As described in this co-pending application, by using seat done 820 to align the frequencies of second comb source 808 with those of first comb source 802, the amount of optical spectrum usable for data transmission is effectively doubled (i.e., minus the single frequency used for seed tone 820) over that of a non-aligned comb source.

For the 4-lane DCI link illustrated in FIG. 8, which incorporates a seed tone from the first comb for second comb generation, since both optical frequency comb sources 802,

808 share the same phase noise properties, the phase coherence between channels of the two respective combs enables the coherent DSP to be greatly simplified by reducing the phase tracking workload. That is, the phase-noise correlation between channels enables easy implementation of the joint phase recovery process (developed by the present inventors and incorporated by reference herein) into the DCI link embodiments described herein to reduce the complexity of the coherent system hardware and DSP for the DCI link.

For ease of illustration, architecture 800 is described with respect to a 4-lane configuration. The person of ordinary skill in the art though, after reading and comprehending the present specification, will understand that this configuration is provided by way of example, and is not intended to be limiting. As described above, these innovative principles may be alternatively, or additionally, adopted and applied for other topologies and DCI link configurations (e.g., 2-lane, 3-lane, 8-lane, etc.).

Additionally, because DCI links tend to span relatively short distances, FDX operation is particularly useful for the DCI link that conforms more closely to the access network paradigm than to the longhaul paradigm. Therefore, for short links such as DCI, a number of the coherent DSP components and/or processes may be located within close physical proximity to many of the DS transceivers and other components, and thus shared among different lanes or across more than one lane, including without limitation, CPR processing (i.e., when using comb source), CD compensation, channel skew compensation, etc.

For example, as further illustrated in FIG. 8, architecture 800 further includes a common DSP unit 822 is included within one transceiver 500 at each of the DS and US sides of architecture 800. In an exemplary embodiment, common DSP unit 822 may be configured to execute some or all of the functional processing of the several DSPs 510, 524, FIG. 5A, DSPs 716, 718, FIG. 7A, above, but then share its coherent signal processing results (e.g., carrier phase, CD, and channel skew, etc.) with other, simplified DSP units 824 of transceivers 500 on the same DS or US side.

In this manner, the DSP hardware and processing resources may be greatly simplified for all but one coherent receiver 504 on each transmission side of architecture 800 utilizing a comb-based coherent integrated WDM comb source. Alternatively, common DSP unit 822 may be a standalone unit on one or both of DS and US sides of architecture 800, and all transceivers 500 (i.e., including transceivers 500(1)) may therefore include a simplified DSP 824 in communication with that respective common DSP 822. Accordingly, common DSP 822 is enabled to provided as much, or as little, DSP as is required for each respective optical lane. That is some optical lanes may require more DSP than others in simultaneous operation. Furthermore, implementation of such common processing elements enables adjustment in real-time as to the particular operating conditions of architecture 800 and the individual optical lanes therein.

Figure 9:
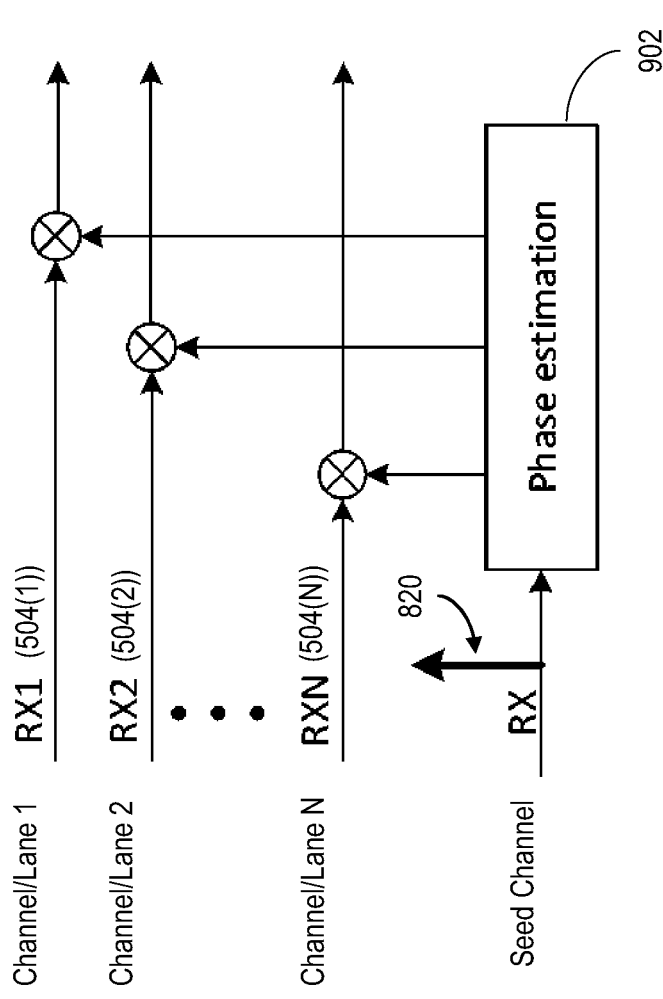
FIG. 9 is a schematic illustration depicting a joint phase recovery process flow, in accordance with an embodiment.

FIG. 9 is a schematic illustration depicting a joint phase recovery process flow 900. In an exemplary embodiment, process flow may be implemented with respect to architecture 800, and implement phase estimation for the unmodulated seed channel of seed tone 820 from first integrated comb source 802, and then applied to other channels/lanes of architecture 800. In exemplary operation, a phase estimation unit 902 is configured to estimate phase information from the seed channel, and then reuse this estimated phase information to compensate the phase variations of other channels. In an exemplary embodiment, phase estimation unit 902 is a dedicated hardware or software module of coherent receiver 504 or a processor thereof. In other embodiments, phase estimation unit 902 is integral to common OFFT reception DSP 524(1), and further configured for operable communication with each of the other simplified OFFT reception DSPs 524(2)-524(N). Through application of this innovative joint phase recovery process among all receivers on a transmission side of architecture 800, the processing complexity of individual receiver DSPs (e.g., DSPs 524(2)-524(N)) will be significantly reduced.

Figure 10:
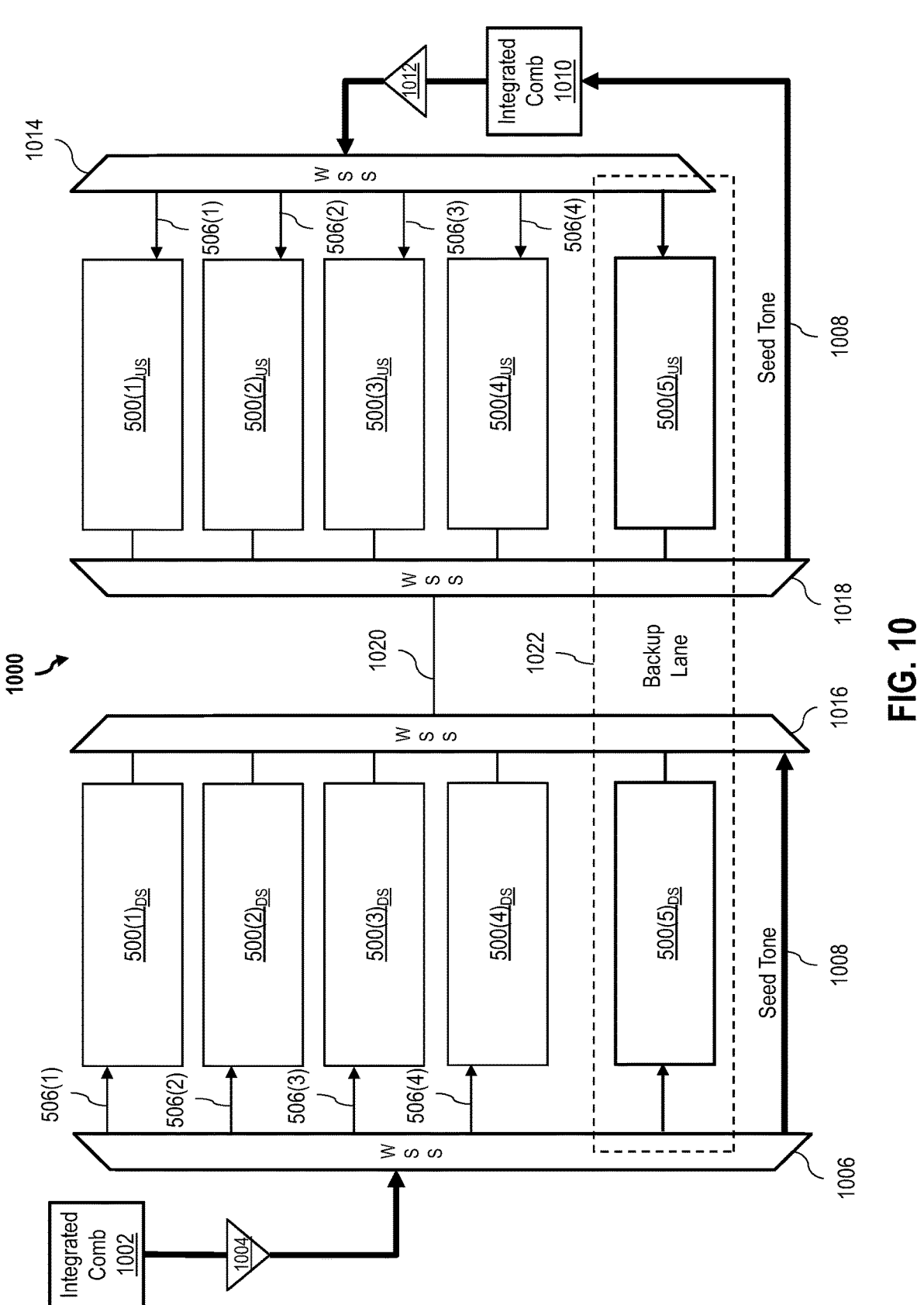
FIG. 10 is a schematic illustration depicting an alternative phase-synchronized comb-based data center interconnect system architecture, in accordance with an embodiment.

FIG. 10 is a schematic illustration depicting an alternative phase-synchronized comb-based DCI system architecture 1000. In the exemplary embodiment depicted in FIG. 10, architecture 1000 includes a topology for a 1.6 Tb/s interface similar to architecture 800, FIG. 8, except that architecture 1000 is configured according to a 5-lane topology instead of the 4-lane topology of architecture 800. Accordingly, architecture 1000 includes five DS coherent transceivers 500 in communication with five opposing US coherent transceivers 500, respectively. Similar though, to architecture 800, architecture 1000 includes (i) a first integrated comb source 1002 and an optional first amplifier 1004 in communication with a first DS wavelength selective switch (WSS) 1006 to provide all of the spaced comb wavelengths used throughout architecture 1000, including a seed tone 1008, and (ii) a second integrated comb source 1010 and optional amplifier 1012 in communication with a first US WSS 1014. Architecture 1000 further includes a second DS WSS 1016 in operable communication with a second US WSS 1018 over an optical communication medium 1020.

By implementing wavelength selective switches instead of multiplexers, architecture 1000 is enabled to provide added redundancy to the DCI link, by way of a backup lane 1022 formed of the fifth optical lane in the 5-lane topology. In an exemplary embodiment, the addition of backup lane 1022 improves both the network redundancy and the reliability of the network overall. In comparison with the WDM multiplexers described above, utilization of WSS 1006, 1014, 1016, 1018 enables additional control functionality for architecture 1000 to switch to backup lane 1022 in the event when one of the primary 4 lanes fails to operate. In an embodiment, one or of WSS 1006, 1014, 1016, 1018 may include a silicon ring resonator-based device that may be easily integrated with one or more of the optical modules of architecture 1000.

As with the embodiments described above, innovative principles of architecture 1000 may be implemented with respect to FDX or non-FDX communication, and are not limited to 4-5-lane topologies. The person of ordinary skill the art will understand that the backup lane 1022 may be provided for a topology including only a single lane (e.g., architecture 756, FIG. 7C), or a topology including as many as eight lanes or greater (e.g., architecture 246, FIG. 2C). In some embodiments, more than one backup lane 1022 may be employed within a single architecture for added redundancy and reliability.

Figure 11:
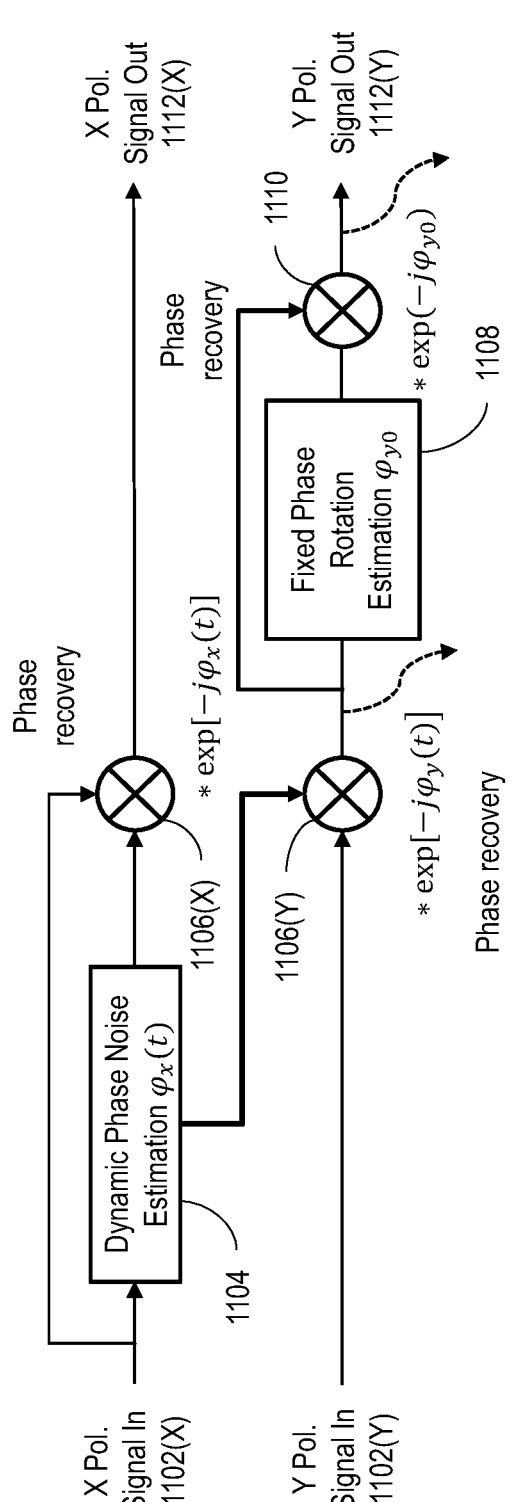
FIG. 11 is a schematic illustration depicting an exemplary carrier phase recovery and compensation process, in accordance with an embodiment.

FIG. 11 is a schematic illustration depicting an exemplary carrier phase recovery and compensation (CPR) process 1100. In an exemplary embodiment, CPR process 1100 is configured to execute (e.g., by a receiver processor) CPR on a dual-polarization carrier input signal 1102, and may utilize a single dynamic phase noise estimation unit 1104 for both of an X-polarization portion and a Y-polarization portion (i.e., input signals 1102(X) and 1102(Y), respectively) of input signal 1102. In an embodiment, unit 1104 functions as a dynamic phase noise estimation unit, and may thus be advantageously configured to processes only a single-polarization input signal 1102 (e.g., input signal 1102(X), in this example), but then output to both of two dynamic mixers 1106(X) and 1106(Y) for both polarizations, respectively.

In an embodiment, CPR process 1100 may further include, for the other single-polarization lane (e.g., Y-polarization, in this example), a fixed phase rotation estimation unit 1108 and a fixed mixer 1110 configured to receive an output from unit 1108. More specifically, dynamic mixer 1106(X) combines single-polarization input signal 1102(X) with an output of single-polarization dynamic phase noise estimation unit 1104 (e.g., $\varphi_x(t)$-based, in this example). Thus, in the example depicted in FIG. 11, phase recovery for an X-polarization output signal 1112(X) is thereby achieved from dynamic mixer 1106(X) through the function $e^{-jw_x(t)}$.

In contrast, dynamic mixer 1106(Y) combines single-polarization input signal 1102(Y) with the same $\varphi_x(t)$-based output of the single dynamic phase noise estimation unit 1104. Since a phase recovery output 1114 of mixer 1106(Y) is based on the function $e^{-jw_x(t)}$, output 1114 will exhibit rotation with respect to X-polarization output signal 1112 (X). Accordingly, in the example depicted in FIG. 11, output 1114 is passed through fixed phase rotation estimation unit 1108, and the output of unit 1108 (e.g., $\varphi_{y,0}$-based) is then combined with output 1114 at fixed mixer 1110 to achieve phase recovery for a Y-polarization output signal 1112(Y) through a function $e^{-j\varphi_{y,0}}$ relating to unit 1108. The person of ordinary skill in the art will understand, through comprehension of the present description and illustrations, that either polarization direction may be selected for processing through the single dynamic phase noise estimation unit.

Therefore, according to the innovative configuration of CPR process 1100, a simplified and hardware-efficient DSP flow is accomplished. In an exemplary embodiment, CPR process 1100 is accomplished in two stages: (1) phase noise estimation using only a single polarization direction; and (2) phase recovery for both polarization directions using the same single-polarization-based phase noise estimation. More particularly, phase noise estimation is performed in the first stage at only a single polarization direction, and this single-direction estimate for the first polarization signal is thus also shared with the second polarization signal to accomplish phase recovery for both polarizations in the second stage. In the exemplary embodiment, phase recovery of the second polarization signal may further utilize fixed phase rotation estimation and recovery through implementation of data-aided or blind estimation processes.

Thus, according to the present systems and methods, DSP processing for a dual-polarization carrier signal be effectively accomplished through performance of only one dynamic phase noise estimation processing stage for both polarizations of the dual-polarization signal. Dynamic phase noise estimation processing is time varying, with high computational complexity. The innovative configuration depicted in FIG. 11 advantageously reduces this computational burden and complexity by approximately half.

CPR process 1100 thus further provides an innovative solution for further simplifying the coherent DSP of DCI links implementing polarization multiplexed coherent signals. That is, as illustrated in the exemplary embodiment depicted in FIG. 11, in the case of a dual-polarization coherent signal, the innovative algorithm of CPR process 1100 may be executed for one of two polarization signals, and the algorithmic output therefrom (e.g., the estimated carrier phase and noise) from the one polarization direction may then be (i) provided for the other polarization signal, and (ii) combined with an estimated fixed phase offset rotation between the two polarizations. In this manner, the complexity of the coherent DSP may be significantly reduced, thereby enabling a more hardware-efficient coherent optical topology for DCI networks.

Figure 12:
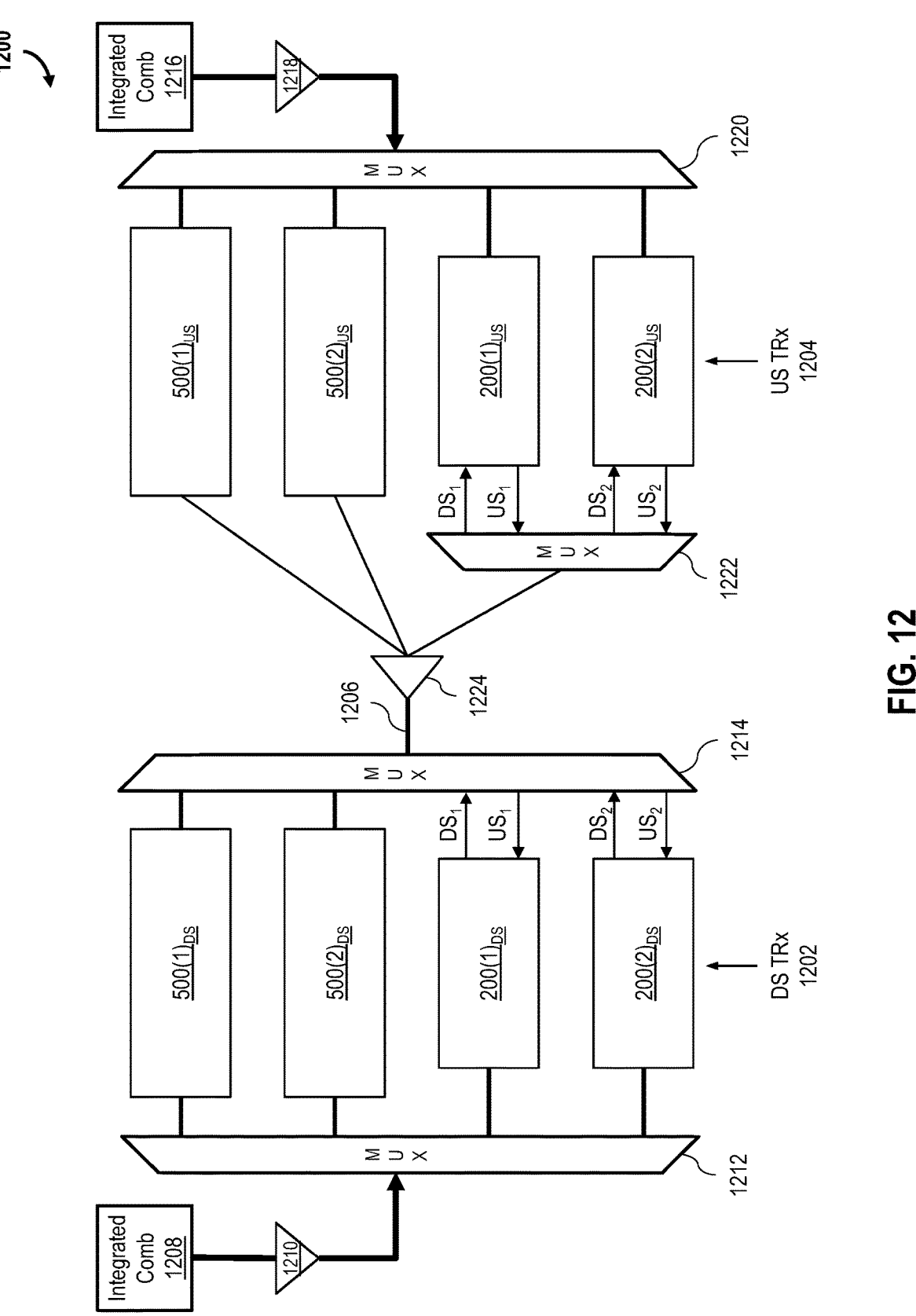
FIG. 12 is a schematic illustration depicting an exemplary hybrid data center interconnect system architecture, in accordance with an embodiment.

FIG. 12 is a schematic illustration depicting an exemplary hybrid DCI system architecture 1200. In the exemplary embodiment depicted in FIG. 12, hybrid architecture 1200 illustrates a 4-lane topology that combines respective features of architecture 222, FIG. 2B, with features of architecture 600, FIG. 6A, to create a hybrid coherent/IM-DD WDM DCI system. That is, similar to the 4-lane topology examples described above, hybrid architecture 1200 also includes a 4-transciever DS transceiver array 1202 in operable communication with a corresponding 4-transciever US transceiver array 1204 over an optical communication medium 1206. Different though, from the above embodiments, each 4-transciever transceiver array 1202, 1204 includes two coherent transceivers 500 and two IM-DD transceivers 200.

On the DS side of hybrid architecture 1200, the general 4-lane topology is similar to comb-based embodiments, and includes a first integrated comb source 1208 and an optional first amplifier 1210 in communication with a first DS multiplexer 1212, from which individual respective DS coherent transceivers 500 and DS IM-DD transceivers 200 obtain a particular DS wavelength as an input laser signal. A second DS multiplexer 1214 is disposed between optical communication medium 1206 and each of DS coherent transceivers 500 and DS IM-DD transceivers 200.

The US side of hybrid architecture 1200 similarly includes a second integrated comb source 1216 and optional amplifier 1218 in communication with a first US multiplexer 1220. Different though, from the DS side, a second US multiplexer 1222 is disposed only between US IM-DD transceivers 200 and optical communication medium 1206. In this configuration, hybrid architecture 1200 further includes a splitter 1224 disposed along the path of optical communication medium 1206, for direct communication with each of US coherent transceivers 500, but indirect communication with IM-DD transceivers 200 through second US multiplexer 1222. Although implementation of seed tones and backup lanes are not illustrated in this example, the person of ordinary skill in the art will appreciate that neither feature is excluded from respective implementation within hybrid architecture 1200.

Figure 13:
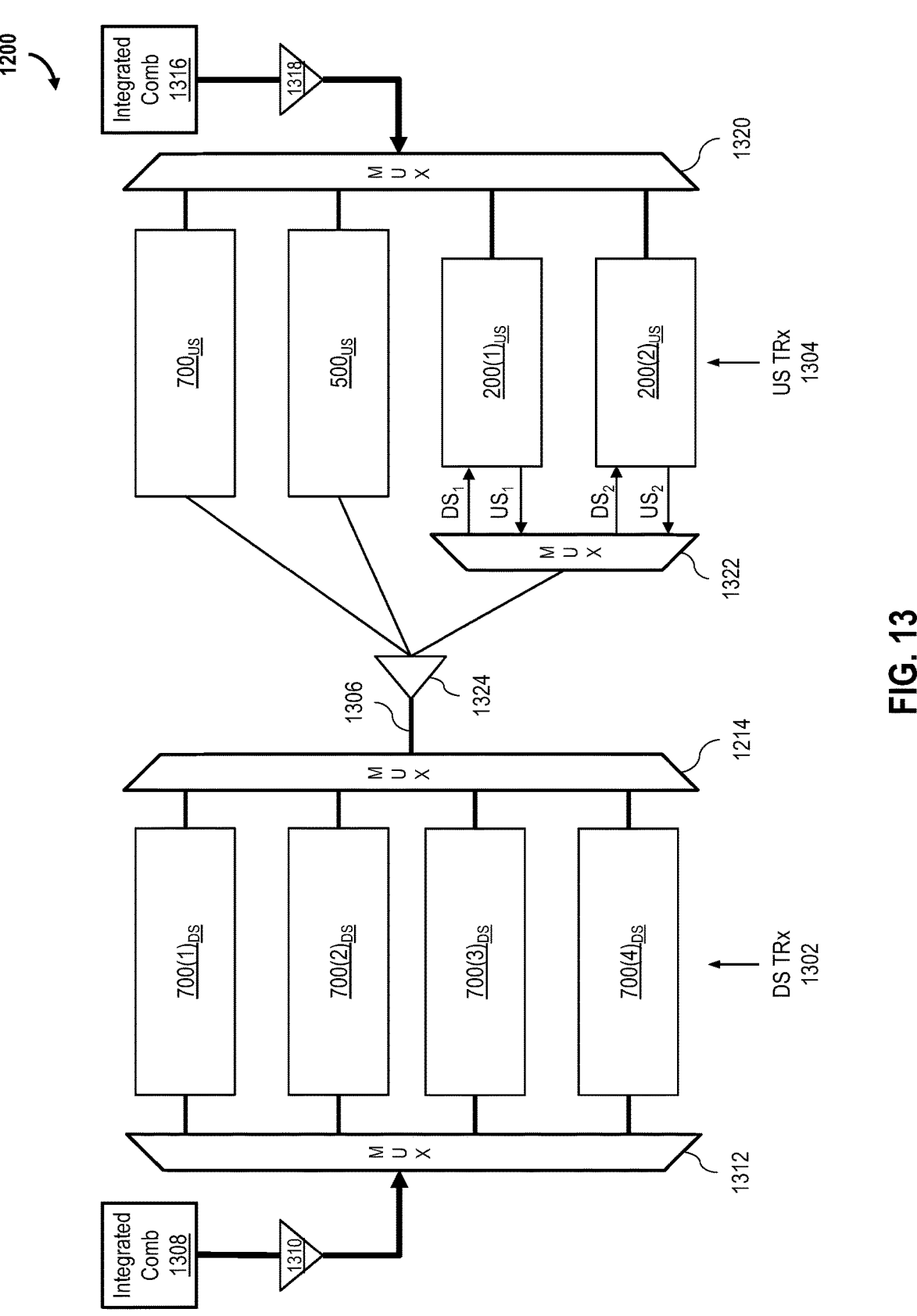
FIG. 13 is a schematic illustration depicting an alternative hybrid data center interconnect system architecture, in accordance with an embodiment.

FIG. 13 is a schematic illustration depicting an alternative hybrid DCI system architecture 1300. In the exemplary embodiment depicted in FIG. 13, hybrid architecture 1300 is similar to hybrid architecture 1200, FIG. 12, and includes a 4-transciever DS transceiver array 1302 in operable communication with a corresponding 4-transciever US transceiver array 1304 over an optical communication medium 1306. Different though, from hybrid architecture 1200, in hybrid architecture 1300, DS transceiver array 1302 includes four individual DS transceivers 700, FIG. 7A, and US transceiver array 1304 includes a single US transceiver 700, a single US transceiver 500 and two US transceivers 200(1), 200(2).

Accordingly, in this configuration, a first optical lane includes DS transceiver 700(1) and US transceiver 700, a second optical lane includes DS transceiver 700(2) and US transceiver 500, a third optical lane includes DS transceiver 700(3) and US transceiver 200(1), and a fourth optical lane includes DS transceiver 700(4) and US transceiver 200(2). The particular distribution of transceivers 200, 500, 700 in the embodiment depicted in FIG. 13 is provided by way of example, and is not intended to be limiting. This example illustrates the versatility of transceiver 700 to any type of opposing optical receiver or optical signal type (e.g., coherent, non-coherent, etc.), enabling improved flexibility for overall DCI system design, and easy adaptation by a DS processor as the receiver of the US transceiver is upgraded or evolves (e.g., to OFFT transceivers enabled for full phase and amplitude modulation).

The remaining topology of hybrid architecture 1300 may be substantially similar to hybrid architecture 1200, and include a first integrated comb source 1308 and an optional first amplifier 1310 in communication with a first DS multiplexer 1312, from which individual respective DS transceivers 700 obtain a particular DS wavelength as an input laser signal. A second DS multiplexer 1314 is disposed between optical communication medium 1306 and each of transceivers 700. The US side of hybrid architecture 1300 includes a second integrated comb source 1316 and optional amplifier 1318 in communication with a first US multiplexer 1320, a second US multiplexer 1322 disposed between US IM-DD transceivers 200 and optical communication medium 1306, a splitter 1324 disposed along the path of optical communication medium 1306.

Accordingly, as may be seen by the innovative configuration of hybrid architecture 1200, use of optical frequency comb sources offers significant improvements to the flexibility and design of the DCI link. Conventionally, coherent and IM-DD technologies were not mixed within the same systems or networks, and particularly in the case where a single bi-directional optical communication medium was provided, due to the interference between coherent and non-coherent optical signals within the same medium. This interference problem was solved by the present inventors in co-pending U.S. patent application Ser. No. 16/238,415, filed Jan. 2, 2019, the disclosure thereof which is incorporated by reference herein in its entirety. According to hybrid architecture 1200 though, a DCI link may incorporate both IM-DD and coherent technologies within the same link, which may thus be more easily configured to meet the different bandwidth, power, and/or transmission distance requirements thereof for the different application scenarios, in which IM-DD or coherent optics modules may be more desirable for the link, depending on the particular scenario.

In an exemplary embodiment, optical frequency comb sources 1208, 1216 provide optical carriers for both of the respective IM-DD and coherent optics transceivers 200, 500, respectively. Similar to the embodiments above, hybrid architecture 1200 is described with respect to a 4-lane configuration by way of example, and not in a limiting sense. The topology of hybrid architecture may employ more, or fewer, optical lanes without departing from the scope herein.

In an exemplary embodiment, one or more of the innovative DCI embodiments described herein may be fabricated onto platforms implementing integrated photonics to further reduce the cost, power consumption, and footprint thereof. For example, one integration path may utilize III-V monolithic integration techniques for all active and passive optical components, but silicon for all electric components. In this example, the optics and electronics may be packaged separately, or integrally co-packaged using 2.5D or 3D integration techniques at the wafer/chip level. In another example, a different integration path may be based on a hybrid silicon photonics platform, where electronic and all optical components other than the comb source and amplifiers (e.g., SOAs) may be fabricated on silicon. In this example, the comb sources and SOAs may be alternatively fabricated on III-V material, and then integrated with the silicon components through hybrid integration. By further leveraging mature CMOS fabrication processes on silicon, such co-packaged electronics/optics for DCI links may be effectively realized with high integration density, high yield, and potential ultra-low power consumption.

According to the systems and methods described herein, innovative DCI link designs, architectures, and topologies are provided through the implementation of optical frequency comb sources, OFFTs, and/or phase domain coherent transmitters. Additionally, a unique hybrid DCI link is achieved that incorporates both IM-DD and coherent optics in a single system or network utilizing an optical frequency comb source.

Exemplary embodiments of DCI systems and methods are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments herein may be implemented and utilized in connection with other signal processing and signal recovery algorithms or techniques.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general-purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A data center interconnect (DCI), comprising:
a downstream (DS) transceiver array including one or more DS transceiver and a first comb source configured to generate one or more first spaced optical signals; and
an upstream (US) transceiver array including one or more US transceivers in operable communication over an optical communication medium with the one or more DS transceivers, respectively, of the DS transceiver array, and a second comb source configured to generate one or more second spaced optical signals.

2. The DCI of claim 1, wherein the DS transceiver array is configured to communicate with the US transceiver array at a 1 Tb/s data rate.

3. The DCI of claim 2, comprising a single-lane topology having a single DS transceiver of the DS transceiver array in communication with a single US transceiver of the US transceiver array over a 1 Tb/s optical lane.

4. The DCI of claim 3, wherein the first and second spaced optical signals include a 64-QAM modulation format.

5. The DCI of claim 3, wherein the single DS transceiver and the single US transceiver comprise first and second coherent optical transceivers, respectively.

6. The DCI of claim 5, wherein the first and second coherent optical transceivers include first and second optical full field transmitters (OFFTs).

7. The DCI of claim 2, comprising a multi-lane topology having a number of DS transceivers of the DS transceiver array equal to a number of US transceivers of the US transceiver array.

8. The DCI of claim 7, wherein the multi-lane topology includes two optical lanes, and wherein the number of DS transceivers is 2.

9. The DCI of claim 8, wherein each lane of the two optical lanes communicates a data rate of 800 Gb/s.

10. The DCI of claim 8, wherein each transceiver of the DS transceivers and the US transceivers includes a coherent transmitter configured to utilize a DP-16PSK modulation format for a PAM-16 driving signal.

11. The DCI of claim 7, wherein the multi-lane topology includes three optical lanes, and wherein the number of DS transceivers is 3.

12. The DCI of claim 11, wherein each transceiver of the DS transceivers and the US transceivers includes a coherent transmitter configured to utilize a DP-8PSK modulation format for a PAM-8 driving signal.

13. The DCI of claim 7, wherein the multi-lane topology includes four optical lanes, and wherein the number of DS transceivers is 4.

14. The DCI of claim 13, wherein each lane of the four optical lanes communicates a data rate of 400 Gb/s.

15. The DCI of claim 13, wherein each transceiver of the DS transceivers and the US transceivers includes a coherent transmitter configured to utilize a DP-QPSK modulation format for a PAM-4 driving signal.

16. The DCI of claim 15, wherein the coherent transmitter comprises an optical full field transmitter (OFFT) including first and second phase modulators.

17. The DCI of claim 16, wherein each of the first and second phase modulators is configured to operate at 100 Gbaud.

18. The DCI of claim 13, further comprising (i) a fifth optical lane configured to function as a backup lane, and (ii) a wavelength selective switch (WSS) configured to switch operation from a particular lane of the four optical lanes to the fifth optical lane upon detection of a failure of the particular lane.

19. The DCI of claim 7, wherein the multi-lane topology includes eight optical lanes, and wherein the number of DS transceivers is 8, and wherein each lane of the eight optical lanes is configured for a 200 Gb/s data rate.

20. A data center interconnect (DCI), comprising:
a downstream (DS) transceiver array including one or more DS transceivers;
a first comb source in operable communication with the DS transceiver array and configured to generate one or more first spaced optical tones and to transmit one optical tone of the one or more first spaced optical tones as a seed tone to a second comb source;

an upstream (US) transceiver array including one or more US transceivers in operable communication over an optical communication medium with the one or more DS transceivers, respectively, of the DS transceiver array; and the second comb source in operable communication with the US transceiver array and configured to receive the seed tone and to generate one or more second spaced optical signals matching the one or more first spaced optical tones based on the seed tone.

* * * * *